United States Patent [19]

Nakayama et al.

[11] Patent Number: 5,662,988
[45] Date of Patent: Sep. 2, 1997

[54] MAGNETO-OPTICAL RECORDING MEDIUM

[75] Inventors: Junichiro Nakayama, Shiki-gun; Hiroyuki Katayama; Akira Takahashi, both of Nara; Kenji Ohta, Kitakatsuragi-gun; Yoshiteru Murakami, Nishinomiya, all of Japan

[73] Assignee: Sharp Kabushiki Kaisha, Osaka, Japan

[21] Appl. No.: 387,294

[22] Filed: Feb. 10, 1995

Related U.S. Application Data

[63] Continuation-in-part of Ser. No. 185,570, Jan. 21, 1994, abandoned.

[30] Foreign Application Priority Data

Jan. 22, 1993 [JP] Japan ................................ 5-9440

[51] Int. Cl.$^6$ ............................ G11B 11/10; G11B 13/04
[52] U.S. Cl. ........................ 428/212; 428/457; 428/635; 428/668; 428/686; 428/694 MM; 428/694 ML; 428/694 EC; 428/900; 369/13; 365/122; 430/945
[58] Field of Search ...................... 428/694 MM, 428/694 ML, 694 EC, 212, 457, 635, 668, 686, 900; 369/13; 365/122; 430/945

[56] References Cited

U.S. PATENT DOCUMENTS

| | | | |
|---|---|---|---|
| 5,258,237 | 11/1993 | Nakaki et al. | 428/694 EC |
| 5,278,810 | 1/1994 | Takahashi et al. | 369/13 |
| 5,481,508 | 1/1996 | Watanabe et al. | 369/13 |

FOREIGN PATENT DOCUMENTS

| | | |
|---|---|---|
| 0258978 | 3/1988 | European Pat. Off. . |
| A-0352548 | 1/1990 | European Pat. Off. . |
| A-0498461 | 8/1992 | European Pat. Off. . |
| A-0513668 | 11/1992 | European Pat. Off. . |
| A-0524745 | 1/1993 | European Pat. Off. . |
| A-0525192 | 2/1993 | European Pat. Off. . |
| A-05012732 | 1/1993 | Japan . |
| A-9215091 | 9/1992 | WIPO . |

OTHER PUBLICATIONS

J. Hirokane et al, "Recording characteristics of a magneto-optical super–resolution disk", SPIE, vol. 2338 Optical Data Storage (1994) pp. 301–304.

T. Fukami et al., "Direct Overwrite Technology Using Exchange–Coupled Multilayers (Invited)" (Proceedings of Magneto–Optical Recording International Symposium '91, J. Magn. Soc. Jpn.,) vol. 15, Supp. No. S1 (1991), pp. 293–298.

M. Ohta et al., "Read out Mechanism of Magnetically Induced Super Resolution" (Proceedings of Magneto–Optical Recording International Symposium '91, J. Magn. Soc. Jpn.), vol. 15, Supp. No. S1 (1991), pp. 319–322.

Primary Examiner—Stevan A. Resan
Attorney, Agent, or Firm—David G. Conlin; William J. Daley, Jr.

[57] ABSTRACT

The magneto-optical recording medium is provided with a readout layer which shows the in-plane magnetization and which changes from the in-plane magnetization to the vertical magnetization when its temperature rises higher than a predetermined temperature by irradiation of the light beam, a memory layer which records information thereon magneto-optically, an intermediate layer which keeps in-plane magnetization from room temperatures to its Curie temperature, and an writing layer which has a Curie temperature higher than that of the memory layer and has coercive force lower than that of the memory layer. Since the intermediate layer becomes a domain wall in optical modulation recording, it prevents the memory layer and the writing layer from forming a domain wall, so information can be recorded in good condition. Moreover, a portion of the readout layer besides a center portion of the light beam shows the in-plane magnetization and masks the memory layer at playback. Therefore, a recording bit can be made small and recording density can be improved without increasing interference of signals from neighboring recording bits, which causes noises.

20 Claims, 16 Drawing Sheets

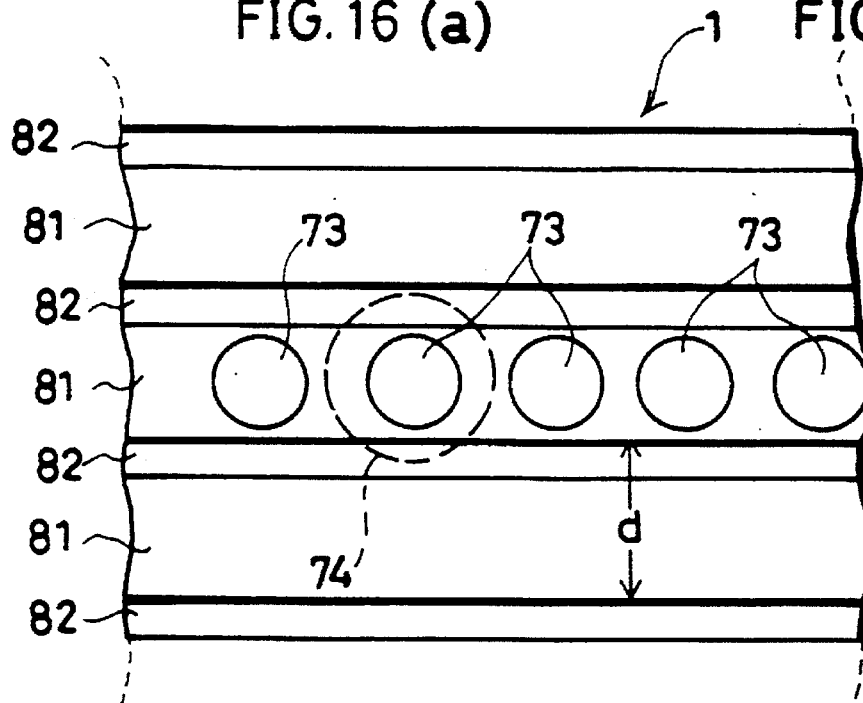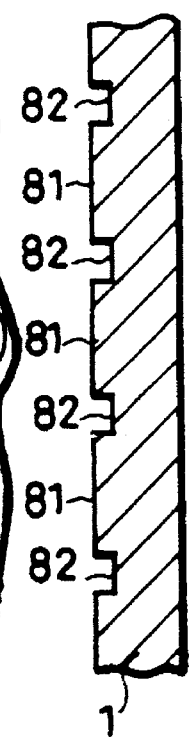
FIG. 16 (a)　FIG. 16 (b)
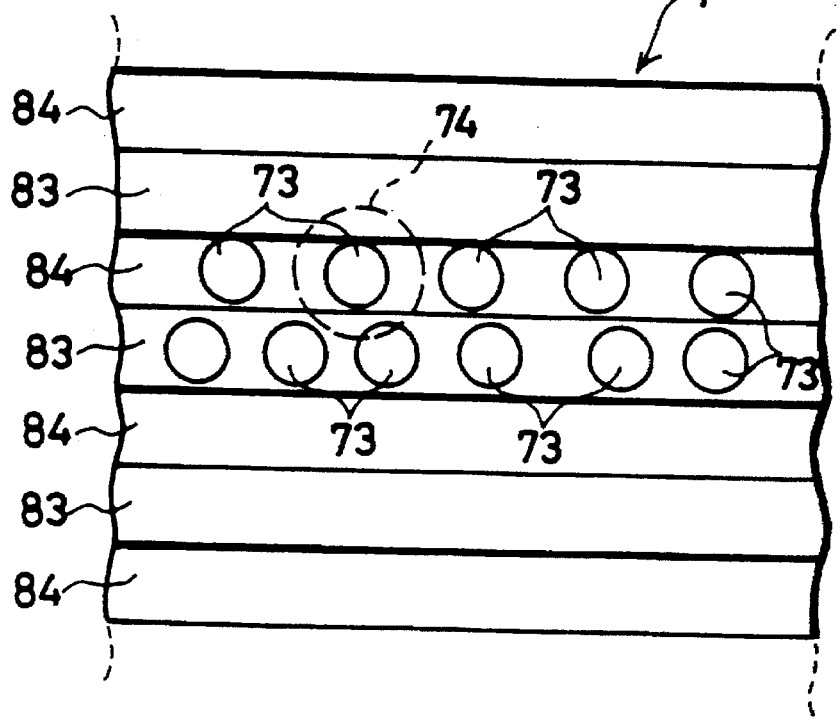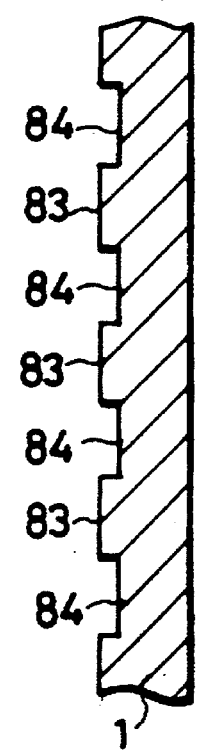
FIG. 17 (a)　FIG. 17 (b)

MAGNETO-OPTICAL RECORDING MEDIUM

This is a continuation-in-part of application Ser. No. 08/185,570 filed Jan. 21, 1994, now abandoned.

FIELD OF THE INVENTION

The present invention relates to a magneto-optical medium, for use in a magneto-optical recording device, such as a magneto-optical recording disk, a magneto-optical tape, and a magneto-optical card.

BACKGROUND OF THE INVENTION

Recently a method is proposed to record and play back a recording bit smaller than the size of a light beam on a recording medium (hereinafter referred to as a spot diameter) in order to improve recording density of the recording medium such as a magneto-optical recording disk.

Usually intensity of the light beam has Gaussian distribution since the light beam is converged to a diffraction limit by a condenser lens in optical recording, so the temperature of the recording medium also has Gaussian distribution. Therefore, a portion having higher temperature than a predetermined temperature is smaller than the spot diameter. Then, if only the portion having higher temperature than the predetermined temperature can be concerned with recording and playback, the recording density will be improved remarkably.

However, the recording density in a conventional magneto-optical recording medium depends on the spot diameter used for recording and playback. That is, in the conventional magneto-optical recording medium, if a recording bit is smaller than a spot diameter of a light beam, there are plural recording bits in the spot. Therefore, signals from the recording bits cannot be separated. Then, if the recording bit is smaller than the spot diameter, interference by unwanted signals due to neighboring recording bits, which is the cause of generating noises, called crosstalk, grows large at playback. That limits improvement of the recording density due to making the recording bits smaller.

SUMMARY OF THE INVENTION

An object of the present invention is to provide a magneto-optical recording medium which improves the recording density by making a recording bit smaller, without increasing interference by unwanted signals due to the neighboring recording bits, which causes a noise.

To achieve the above described object, a magneto-optical recording medium in accordance with the present invention comprises: (1) a readout layer which shows in-plane magnetization at room temperatures while changes from the in-plane magnetization to vertical magnetization when the temperature of a portion irradiated with a light beam is over a predetermined temperature; (2) a memory layer which records information magneto-optically; (3) an intermediate layer showing in-plane magnetization from room temperatures to its Curie temperature and having a film thickness thinner than that of the readout layer; and (4) an writing layer having a Curie temperature: Nigher than that of the memory layer, its coercive force at room temperatures being lower than coercive force at room temperatures of the memory layer.

Another magneto-optical recording medium in accordance with the present invention comprises the same structure except that an intermediate layer showing in-plane magnetization at room temperature and perpendicular magnetization when temperature is not less than a predetermined temperature higher than a temperature where a magnetization of the readout layer changes from in-plane magnetization to perpendicular magnetization substitutes for the intermediate layer of the first described magneto-optical recording medium.

When recording on the magneto-optical recording medium having the above described arrangement by the optical modulation overwriting, for example, first, initializing magnetic field which is smaller than the coercive force of the memory layer at room temperature is applied, so as to initialize the magnetization direction of the writing layer in one direction. Nevertheless, the magnetization of the memory layer does not turn over since coercive force of the memory layer is greater than the initializing magnetic field. Next, a recording magnetic field which is enough smaller than the initializing magnetic field is applied on the recording medium. At the same time, a light beam modulated so as to have both high and low level intensity is irradiated onto the recording medium in the following manner.

When the modulated light beam of high level intensity is irradiated onto the recording medium, both the temperature of the memory layer and that of the writing layer rise near or above their own Curie temperatures respectively. Then, the magnetizations of the both layers once become 0. Consequently, the magnetization of the writing layer turns over due to the recording magnetic field. When the cooling process begins after the light beam leaves, the magnetization of the writing layer is copied to the memory layer so that the magnetization direction of the memory layer coincides with that of the writing layer by the coupling force exerted between the writing layer and the memory layer, and turns in the direction of the recording magnetic field.

On the other hand, when the modulated light beam of low level intensity is irradiated, the temperature of the memory layer rises near the Curie temperature or higher temperature, but that of the writing layer does not rise near the Curie temperature. Therefore, though the magnetization of the memory layer once becomes 0, that of the writing layer does not change. Consequently, magnetization direction of the writing layer does not turn over due to the recording magnetic field. When the cooling process begins after the light beam leaves, the magnetization of the writing layer is copied to the memory layer so that the magnetization direction of the memory layer coincides with that of the writing layer by the above described coupling force, and turns in the opposite direction to the recording magnetic field.

That is, the magnetization direction of the memory layer can be changed by controlling the level of light beam. In this way, information can be recorded in a desired portion of the memory layer, so the information can be recorded due to the optical modulation overwriting.

By the Way, both the memory layer and the writing layer show vertical magnetic anisotropy, so a domain wall would occur in either layer so that the recording would be interrupted according to the magnetic condition, if there were no measures provided in order to prevent the domain wall occurring. Therefore, the magneto-optical recording medium of the present invention is provided with an intermediate layer, which shows the in-plane magnetization from room temperatures to the Curie temperature between the memory layer and the writing layer. At this time, since the intermediate layer forms a domain wall, information reproducing with excellent super-resolution are made possible.

Moreover, at room temperature, since the intermediate layer shows in-plane magnetization, the memory layer is sandwiched by two layers showing in-plane magnetizations, that is, the readout layer and the intermediate layer. Therefore, since the magnetic influence from the memory layer to the writing layer is reduced, it is made possible to reduce the initializing magnetic field even if the intermediate layer is thin.

Moreover, since the film thickness of the intermediate layer is thinner than that of the readout layer, an exchange-coupling force exerted between the writing layer and the memory layer is increased during the cooling process after raising the temperature, thereby the magnetization direction of the writing layer being easily copied to the memory layer. Therefore, the recording is carried out by optical modulation overwriting without obstacles.

Meanwhile another magneto-optical recording medium in accordance with the present invention is provided with an intermediate layer between the memory layer and the writing layer which shows in-plane magnetization at room temperature and perpendicular magnetization when temperature is not less than a predetermined temperature higher than a temperature where a magnetization of the readout layer changes from in-plane magnetization to perpendicular magnetization.

With this arrangement, since the intermediate layer shows in-plane magnetization at room temperature, the memory layer is sandwiched by two layers showing in-plane magnetizations, that is, the readout layer and the intermediate layer, same as the above-described. Therefore, since the magnetic influence from the memory layer to the writing layer is reduced, it is made possible to initialize the writing layer with a smaller initializing magnetic field.

Moreover, since the temperature where the the magnetization of the readout layer changes from in-plane magnetization to perpendicular magnetization is lower than the temperature where the the magnetization of the intermediate layer changes from in-plane magnetization to perpendicular magnetization, the readout layer shows perpendicular magnetization while the intermediate layer shown in-plane magnetization during reproducing. Therefore, since the magnetizations of the memory layer and the readout layer are not influenced by the writing layer, information can be reproduced stablly with excellent super-resolution.

Moreover, since the magnetization of the intermediate layer changes to perpendicular magnetization at a high temperature, the exchang-coupling force exerted between the writing layer and the memory layer is increased during the cooling process thereafter, thereby the magnetization direction of the writing layer being easily copied to the memory layer. Therefore the recording is carried out by optical modulation overwriting without obstacles.

For the respective magneto-optical recording media, the light beam is irradiated to the readout layer at playback. The temperature of the irradiated portion on the magneto-optical recording medium shows Gaussian distribution because the light beam intensity shows Gaussian distribution. Therefore, the temperature rises only in the portion smaller than the diameter of the light beam. According as the temperature rises, the temperature-risen portion of the readout layer changes from the in-plane magnetization to the vertical magnetization. At this time, the magnetization direction of the memory layer is copied to the readout layer from the portion of the memory layer corresponding to the temperature-risen portion of the readout layer by the coupling force exerted between the readout layer and the memory layer. Therefore, the magnetization direction of the readout layer coincides with that of a corresponding portion of the memory layer.

Then, information recorded in the memory layer is played back, based on the reflected light from the portion of the readout layer where the temperature rises.

When the next recording bit is played back with a shift of the light beam, the temperature of the portion where the temperature previously rose in the readout layer falls, and its magnetization changes from the vertical magnetization to the in-plane magnetization. Then, the magnetization recorded in the portion of the memory layer corresponding to the portion of the readout layer where the temperature rose is masked by the in-plane magnetization of the readout layer, so it comes not to be read out. It results in that interference by unwanted signals due to neighboring recording bits which causes noises, or crosstalk, is vanished.

As described, since only the portion having a temperature higher than the predetermined temperature in the readout layer is used at playback, a recording bit smaller than the spot diameter of the light beam can be played back so that recording density improves remarkably.

BRIEF DESCRIPTION OF THE DRAWINGS

FIGS. 16(a) and (b) are the explanatory views showing an example of shape of both the lands and the grooves provided on a substrate of the magneto-optical recording disk.

FIGS. 17(a) and (b) are the explanatory views showing another example of shape of both the lands and the grooves provided on a substrate of the magneto-optical recording disk.

DESCRIPTION OF THE EMBODIMENTS

The following description explains an embodiment of the present invention with reference to FIGS. 1 to 24, taking a magneto-optical recording disk as an example of a magneto-optical recording medium.

Figure 1:
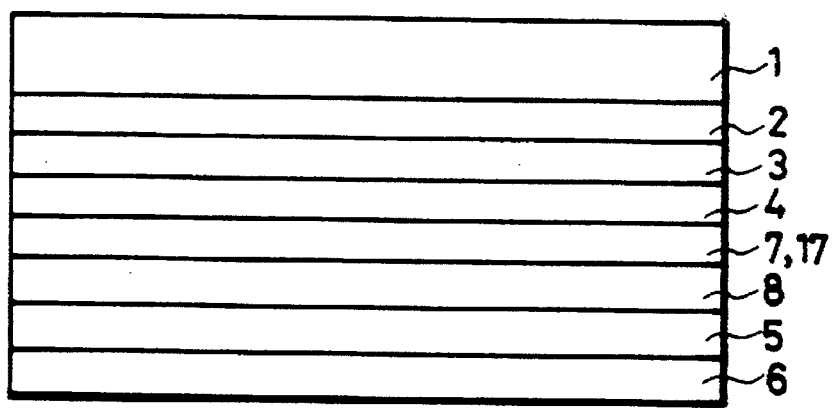
FIG. 1 is an explanatory view showing a structure of a magneto-optical disk in a first and a second embodiments of the present invention.

As shown in FIG. 1, a magneto-optical recording disk in accordance with the present embodiment is composed of a substrate 1, a transparent dielectric layer 2, a readout layer 3, a memory layer 4, an intermediate layer 7, a writing layer 8, a protection layer 5, and an overcoating layer 6. The layers are laminated in the above described order.

The rare earth-transition metal alloys are used for the readout layer 3 having compositions described later in detail. First, the magnetic property is explained conceptually.

Figure 2:
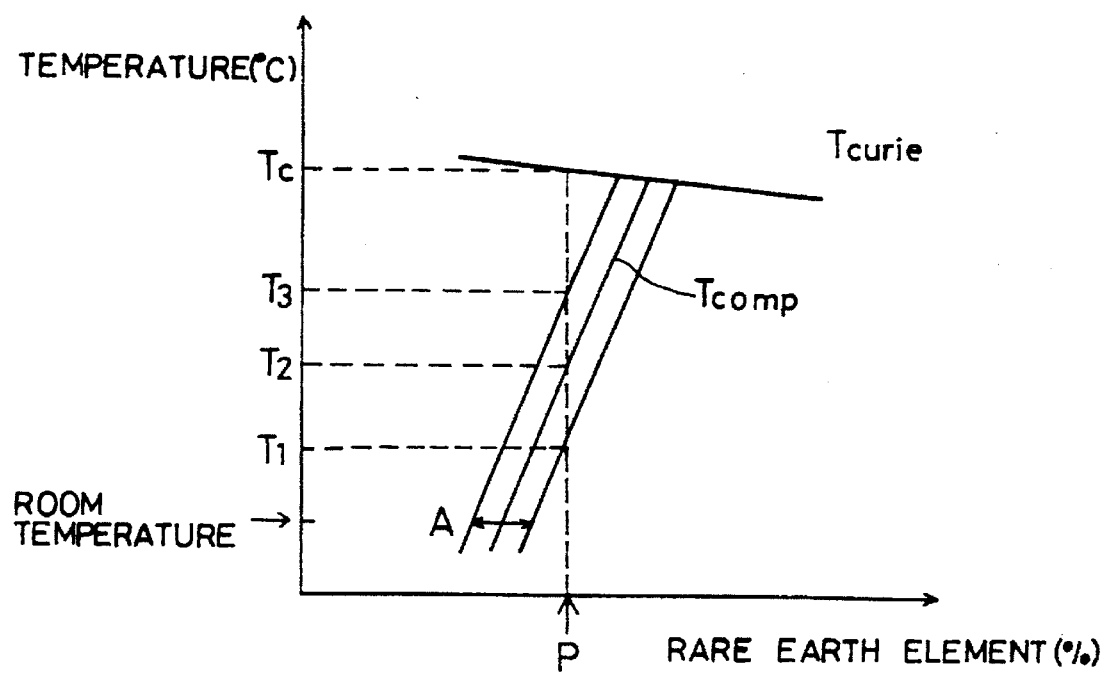
FIG. 2 is an explanatory view showing magnetic condition in a readout layer of the magneto-optical recording disk.

FIG. 2 shows conceptually the condition of the magnetization in the rare earth-transition metal alloy used for the readout layer 3. The horizontal axis shows the content of the rare earth metals, and the vertical one shows the temperature. A curve inclined upwards towards the right shows a compensation temperature $T_{comp}$, and a curve inclined downwards towards the right shows a Curie temperature $T_{curie}$. At each temperature, it is only in a narrow composition range (compensation composition) near the compensation temperature curve that a magnetic moment of the rare earth metals and that of the the transition metals balance, and the alloy shows the vertical magnetization as a whole. The alloy shows the in-plane magnetization in other compositions. In the figure, "A" shows a range of the compensation composition at room temperatures.

By the way, the temperature property of the magnetic moment differs between the rare earth metals and the transition metals. The magnetic moment of the transition metals is greater than that of rare earth metals at high temperatures. Therefore, in the embodiment, content of the rare earth metals is made greater than the compensation composition at room temperatures so that the alloy may show not vertical but the in-plane magnetization at room temperatures. Then, when the light beam is projected so as to rise the temperature of a portion, the magnetic moment of the transition metals grows greater relatively so as to balance with the magnetic moment of the rare earth metals. Therefore, the alloy shows the vertical magnetization as a whole.

Figure 3:
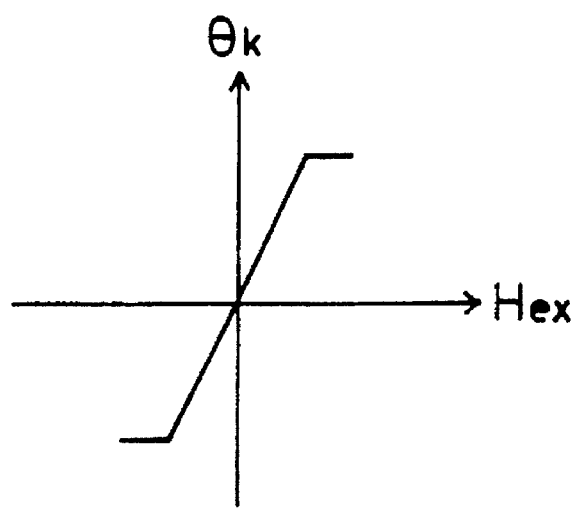
FIG. 3 is an explanatory view showing relationship between the Magnetic Kerr Rotating Angle and the external magnetic field applied to the readout layer in a range between room temperatures and the temperature T1.
Figure 4:
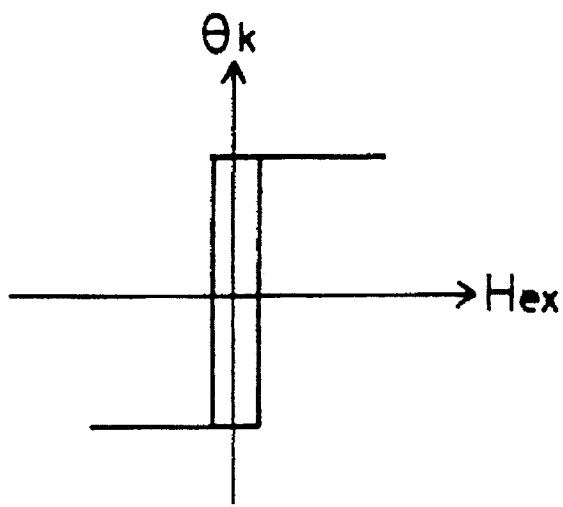
FIG. 4 is an explanatory view showing relationship between the Magnetic Kerr Rotating Angle and the external magnetic field applied to the readout layer in a range between the temperature T1 and the temperature T2.
Figure 5:
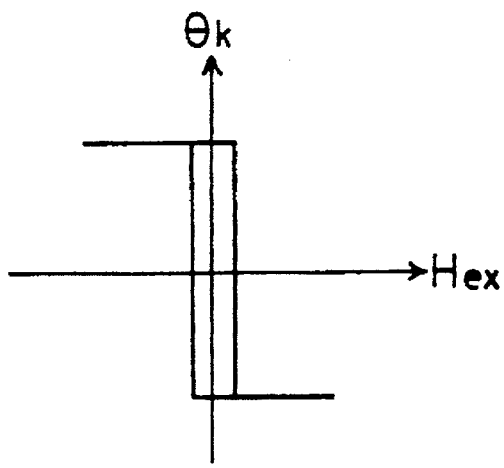
FIG. 5 is an explanatory view showing relationship between the Magnetic Kerr Rotating Angle and the external magnetic field applied to the readout layer in a range between the temperature T2 and the temperature T3.
Figure 6:
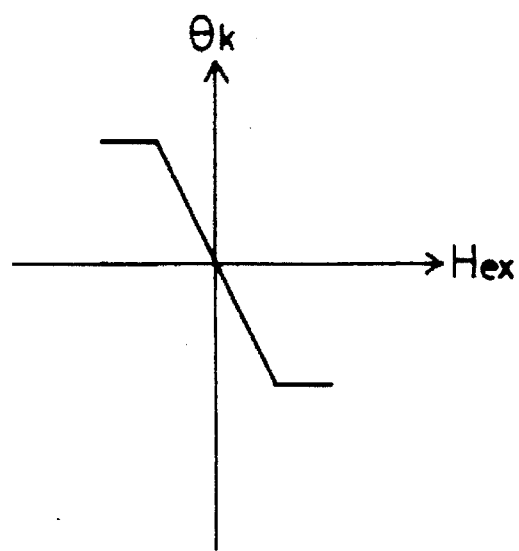
FIG. 6 is an explanatory view showing relationship between the Magnetic Kerr Rotating Angle and the external magnetic field applied to the readout layer in a range between the temperature T3 and the a Curie temperature Tc.

Next, FIGS. 3 to 6 conceptually show the relationship, i.e., hysteresis property, between the external magnetic field $H_{ex}$ (the horizontal axis in the figure) applied vertically onto the surface of the readout layer 3, and the Magnetic Kerr Rotating Angle $\theta_K$ (the vertical axis in the figure), when the light beam is irradiated vertically on the surface. FIG. 3 shows the hysteresis property of a composition P in FIG. 2, from room temperatures to the temperature T1. Similarly, FIGS. 4, 5, and 6 show the hysteresis property from the temperature T1 to T2, from T2 to T3, and from T3 to the Curie temperature Tc, respectively.

As shown in FIGS. 4 and 5, the Magnetic Kerr Rotating Angle $\theta_K$ rises abruptly for external magnetic field $H_{ex}$ in the range from the temperature T1 to T3, and is not 0 even when the external magnetic field $H_{ex}$ is 0. Meanwhile, FIGS. 3 and 6 show the Magnetic Kerr Rotating Angle $\theta_K$ is almost 0 when the external magnetic field $H_{ex}$ is 0, in the range from room temperatures to the temperature T1 and from the temperature T3 to the Curie temperature Tc.

For the readout layer 3, with the above described magnetic property, where the content of the rare earth metals is more than the compensation composition at room temperature, $Gd_{0.26}(Fe_{0.82}Co_{0.18})_{0.74}$ is used, having a film thickness of 50 nm and a Curie temperature Tc of about 300° C., and changing from the in-plane magnetization to the perpendicular magnetization at about 120° C., for example in this embodiment.

$Dy_{0.23}(Fe_{0.78}Co_{0.82})_{0.77}$ is used for the memory layer 4 with a film thickness of 50 nm and a Curie temperature Tc of about 200° C., for example in this embodiment. DyFeCo has small perpendicular magnetic anisotropy, so the external magnetic field Ha used at recording can be reduced.

$Gd_{0.30}(Fe_{0.78}Co_{0.22})_{0.70}$ is used for the intermediate layer 7 with a film thickness of 20 nm for example. In case where the film thickness of the intermediate layer 7 is thinner than that of the readout layer 3, information reproducing with excellent super-resolution and optical modulation over writing are made possible.

$(Gd_{0.50}Dy_{0.50})_{0.25}(Fe_{0.78}Co_{0.22})_{0.75}$ is used for the writing layer 8 with a film thickness of 50 nm and a Curie temperature Tc of about 300° C., for example.

$(Gd_{0.5}Dy_{0.5})_{0.25}(Fe_{0.78}Co_{0.22})_{0.75}$ is used for the writing layer 8 with a membrane thickness of 50 nm and a Curie temperature of about 300° C., for example.

For the substrate 1, a disk made of glass having an outer diameter of 86 mm, an inner diameter of 15 mm, and a thickness of 1.2 mm is used for example, and a surface of the transparent dielectric layer 2 side is provided with guide tracks, having a pitch of 1.6 μm (a groove with width of 0.8 μm and a land with width of 0.8 μm), for guiding the light beam. The guide tracks are made in accordance with the reactive ion etching method.

Transparent AlN, with an index of refraction of 2.0 and a membrane thickness of 80 nm is used as the transparent dielectric layer 2. AlN is a kind of nitride membrane and has high humidity resistance.

AlN with an index of refraction of 2.0 and a membrane thickness of 20 nm is used as the protection layer 5.

Ultraviolet radiation hardened resin belonging to the polyurethane acrylate family is used as the overcoating layer 6, having a membrane thickness of 5 μm. This ultraviolet radiation hardened resin is hardened by irradiation of ultraviolet radiation light from an ultraviolet radiation light irradiating device after being coating the protection layer 5 with a spin coater for example.

Note that the transparent dielectric layer 2, the readout layer 3, the memory layer 4, the intermediate layer 7, the writing layer 8, and the protection layer 5 are formed by sputtering for example: the transparent dielectric layer 2 and the protection layer 5 are formed by sputtering Al targets with $N_2$ gas atmosphere or mixture gas atmosphere of Ar gas and $N_2$ gas, which is called reactive DC sputtering. The readout layer 3, the memory layer 4, the intermediate layer 7, and the writing layer 8 are formed by sputtering (1) complex targets wherein Gd tips or Dy tips are aligned on FeCo alloy targets or (2) alloy targets of GdFeCo, DyFeCo and GdDyFeCo with Ar gas atmosphere.

The following is an explanation of features of the above described magneto-optical disk of this embodiment by use of a concrete example of recording and playback of information with respect to the magneto-optical disk.

Figure 7:
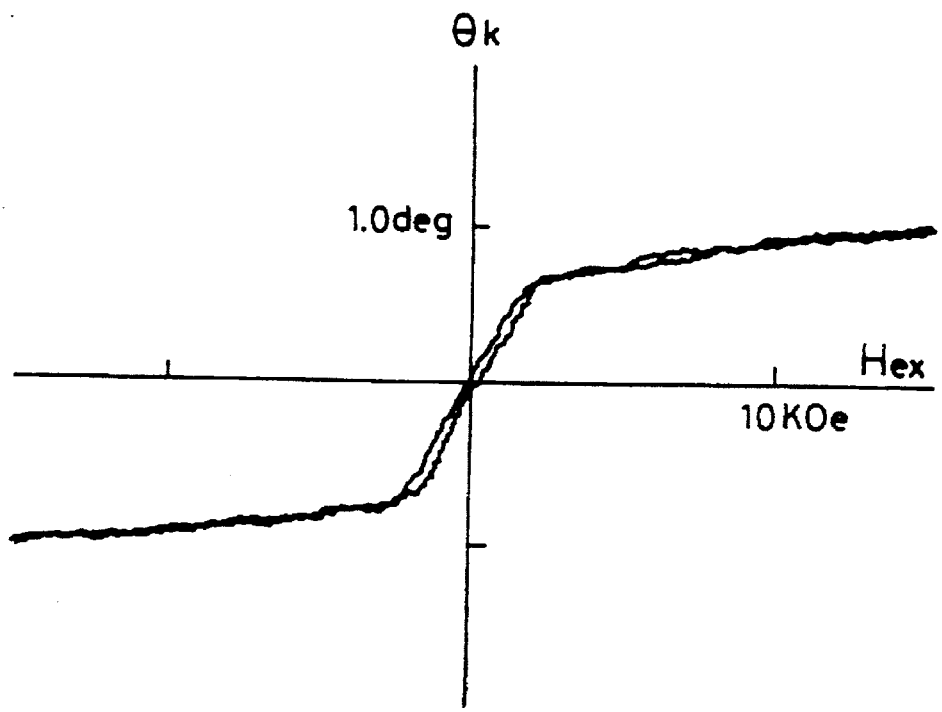
FIG. 7 is an explanatory view showing a graph of relationship between the Magnetic Kerr Rotating Angle and the external magnetic field applied to the readout layer having the property of FIG. 2 at room temperatures.
Figure 8:
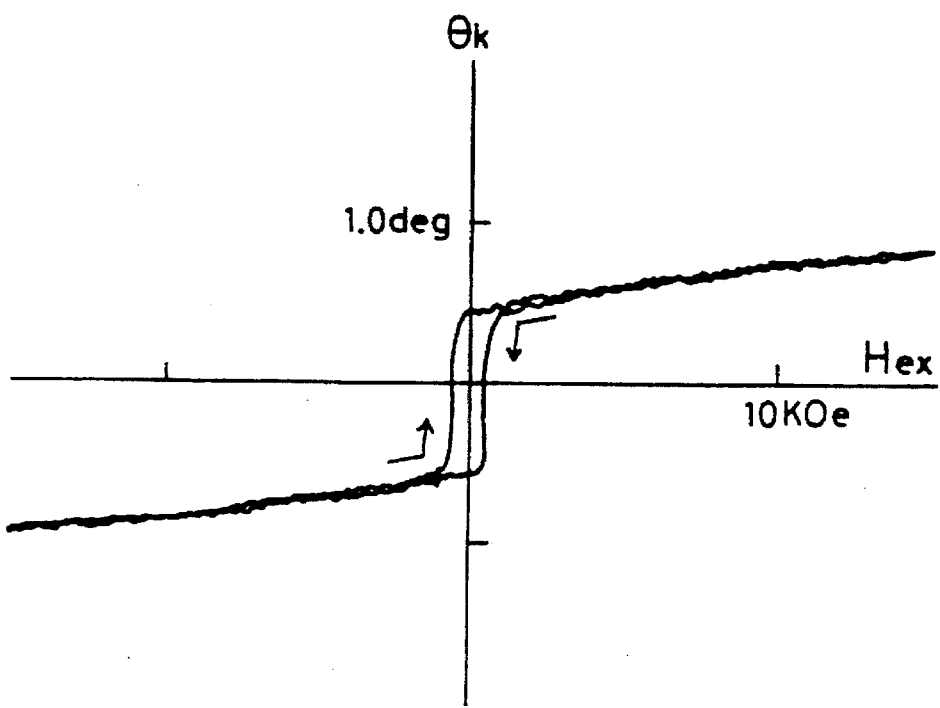
FIG. 8 is an explanatory view showing a graph of relationship between the Magnetic Kerr Rotating Angle and the external magnetic field applied to the readout layer having the property of FIG. 2 at b 120° C.

The first explanation is about the magnetic property of the magneto-optical recording disk in this arrangement. FIGS. 7 and 8 show the results of measuring the hysteresis property of the readout layer 3 with changing temperatures. The figures correspond to conceptual FIG. 3 and FIG. 6 respectively. FIG. 7 shows the hysteresis property of the readout layer 3 at the room temperature (25° C.), showing that the Magnetic Kerr Rotating Angle $\theta_K$ is almost 0 when external magnetic field $H_{ex}$ is 0 at room temperatures as already described. It tells that the readout layer 3 has the in-plane magnetization. FIG. 8 shows the hysteresis property at 120° C., showing that the Magnetic Kerr Rotating Angle $\theta_K$ is about 0.5 degrees when the external magnetic field $H_{ex}$ is 0 at 120° C. It tells that the magnetization of the readout layer 3 has changed to the vertical magnetization.

That fact is also shown by the following measurement. It is the measurement in the magneto-optical disk of the embodiment about the relationship between the amplitude of the playback signals and the playback-use light beam intensity.

An optical head is used here wherein the light beam has a wave length of 780 nm and an objective lens has a numerical aperture (N.A.) of 0.55 which converges the light beam on the predetermined portion of the magneto-optical disk. First, the single frequency recording bits having a length of 0.765 μm was recorded at a rotation speed of 1800 rpm (the linear speed of 5 m/s) beforehand on a land formed at 26.5 mm far from the center of the magneto-optical disk. This was recorded as follows: The memory layer 4 was made of erased condition by arranging the magnetization direction of the memory layer 4 in one direction. Afterwards, a direction of the external magnetic field was fixed in the reverse direction. Then, the bits were recorded by modulating the light beam with recording frequency (about 3.3 MHz) corresponding to 0.765 μm. Intensity of the recording light beam was about 8 mW. The next described magneto-optical disk was used as a comparative disk.

The comparative magneto-optical disk is made by laminating an AlN layer of 80 nm, with a magnetic layer of 20 nm made of DyFeCo, an AlN layer of 25 nm, an AlNi layer of 30 nm, and the overcoating layer 6, in that order, on the substrate 1. That is, the AlN layer of a dielectric layer is formed on both sides of a thin magnetic layer of DyFeCo (the rare earth-transition metal alloy), and the AlNi layer of a reflecting layer is formed on it. The structure is called reflecting membrane structure. The magnetic layer shows the vertical magnetization between room temperatures and high temperatures.

Figure 9:
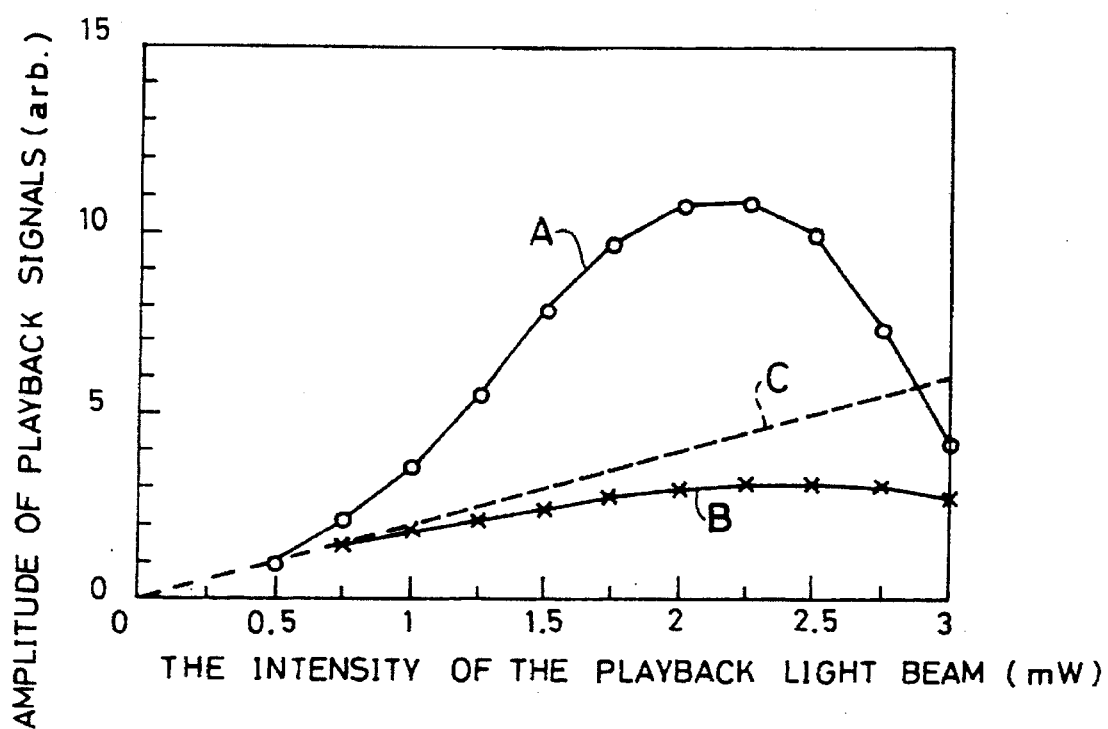
FIG. 9 is an explanatory view showing a graph of relationship between intensity of the playback light beam and the amplitude of the playback signals in the readout layer having the property of FIG. 2.

The recorded bit string was played back in various intensity of the playback light beam. FIG. 9 shows the results of measurement of the amplitude of the playback signals. The horizontal axis is intensity of the playback light beam, and the vertical axis is the amplitude of the playback signals. The amplitude of playback signals was measured in the range of the intensity of the playback light beam of 0.5 mW to 3 mW and was normalized with the amplitude at 0.5 mW. The curve A shows the results of the magneto-optical recording disk of this embodiment, and the curve B shows the results in the comparative magneto-optical recording disk. The straight line C passes an origin and a point of the amplitude at 0.5 mW, showing proportional relationship between the playback light beam intensity and the amplitude of the playback signals. The relationship is as follows:

The amplitude of the playback signals is in proportion to both the amount of reflected light from the recording medium and the Magnetic Kerr Rotating Angle wherein the amount of reflected light from the recording medium is in proportion to the playback light beam intensity.

As shown in the figure, the amplitude of playback signals in the magneto-optical recording disk in the embodiment increases according to the increase of the playback light beam intensity to be maximum at 2 mW to 2.25 mW and is above the straight line C. It proves that the amplitude of the playback signals increases more than increasing of the playback light beam intensity, that is, more than increasing of the amount of reflected light from the recording medium. It also tells that the Magnetic Kerr Rotating Angle $\theta_K$ is almost 0 at low temperatures but changes abruptly from the in-plane magnetization to the vertical magnetization according to the temperature rising due to the irradiation of the playback light beam in the readout layer 3.

The curve B indicating the amplitude of the playback signals in the comparative magneto-optical disk is below the straight line C. The reason is as follows: When the playback light beam intensity increases, the temperature of the magnetic layer increases as well as the amount of reflected light from the recording medium. Generally, the magnetization of the magnetic layer decreases according to the temperature rising so as to be 0 at a Curie temperature. Therefore, in the comparative magneto-optical recording disk, the Magnetic Kerr Rotating Angle $\theta_K$ decreases according to the temperature rising, resulting in that the curve B is always below the straight line C.

Next, it is explained from points of view of the signal quality C/N, which shows the quality of playback signals, and the crosstalk amount, how to increase the recording density in magneto-optical recording by using material which has the above described magnetic property for the readout layer 3.

First, the relationship between a length of the recording bit and the signal quality C/N in playback signals was researched by recording under the same condition and the same device as the foregoing case but with the different recording frequency. The optical resolution of an optical head is shown as follows, by a length of the recording bit as a standard of the measurement. More specifically, a cut off space frequency is used as an indicator of the optical resolution in an optical head, and is determined by both the wave length of a light beam and a numerical aperture N.A. of an objective lens. For example, when the wave length is 780 nm and N.A. is 0.55, which are the values of the optical head used in this measurement, the cut off space frequency is calculated and converted to the length of recording bit as below:

$$780 \text{ nm}/(2\times 0.55)/2=0.355 \text{ μm}$$

That is, the optical resolution of the optical head in this example is limited so as to have a recording bit length of 0.355 μm.

Figure 10:
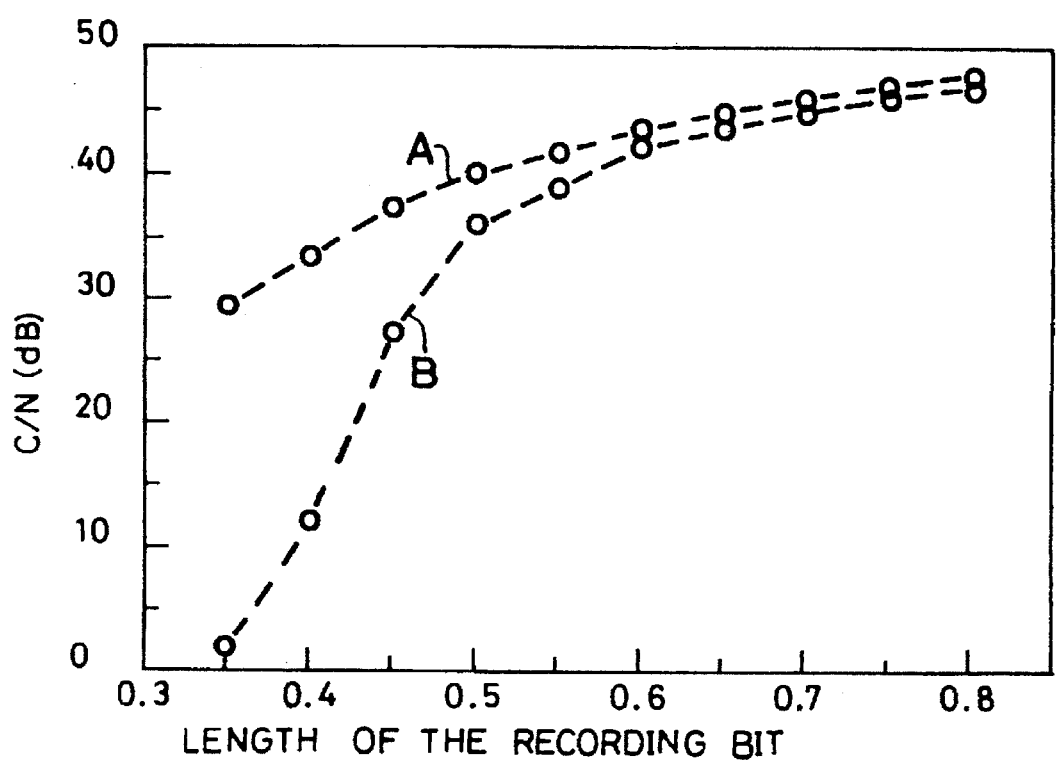
FIG. 10 is an explanatory view showing a graph of relationship between length of the recording bit and the signal quality of the playback signals in the readout layer having the property of FIG. 2.

The result is shown in FIG. 10. The curve A indicates the measurement in the magneto-optical disk of this embodiment with a playback light beam intensity of 2.25 mW. The curve B indicates the measurement in the comparative magneto-optical disk with a playback light beam intensity of 1 mW. There is little difference between the both curves in a recording bit longer than 0.6 μm, but the curve A is above the curve B in a recording bit shorter than 0.6 μm. That shows the quality of playback signals in the magneto-optical disk of this embodiment is good. Especially, it is proved that the magneto-optical disk of this embodiment has a good signal quality C/N of about 30 dB even in a recording bit shorter than 0.355 μm, which is the limit of the optical resolution.

In contrast, in the comparative magneto-optical recording disk, the signal quality decreases abruptly at a recording bit shorter than 0.6 μm. This is because the number or the area of the recording bits existing in the playback light beam spot increases according to decrease of length of the recording bit, resulting in that each recording bit cannot be distinguished. Moreover, the signal quality C/N is about 0 at the recording bit length of 0.355 μm which is the limit of optical resolution.

Therefore, from a point of view of signal quality in the magneto-optical disk of this embodiment, a recording bit smaller than an optical diffraction limit can be played back, which improves the recording density.

Next, an explanation is described about the measurement of the relationship between the recording bit length and the crosstalk amount.

Generally, in a land-type magneto-optical disk which has grooves not used for recording and has lands used for recording, guide tracks with wide lands and narrow grooves are provided. The crosstalk occurs because information played back from both neighboring lands are contaminated when playing back information from an arbitrary land. For example, in IS 10089 Standard, it is required that the crosstalk is less than −26 dB for a recording bit of 0.765 μm in the guide track with a pitch of 1.6 μm. Then, the crosstalk for the recording bit of 0.765 μm was measured by using a substrate 1 of which width of a groove was 0.8 μm and width of a land was 0.8 μm, based upon measuring method of the crosstalk determined in the IS 10089 Standard.

Figure 11:
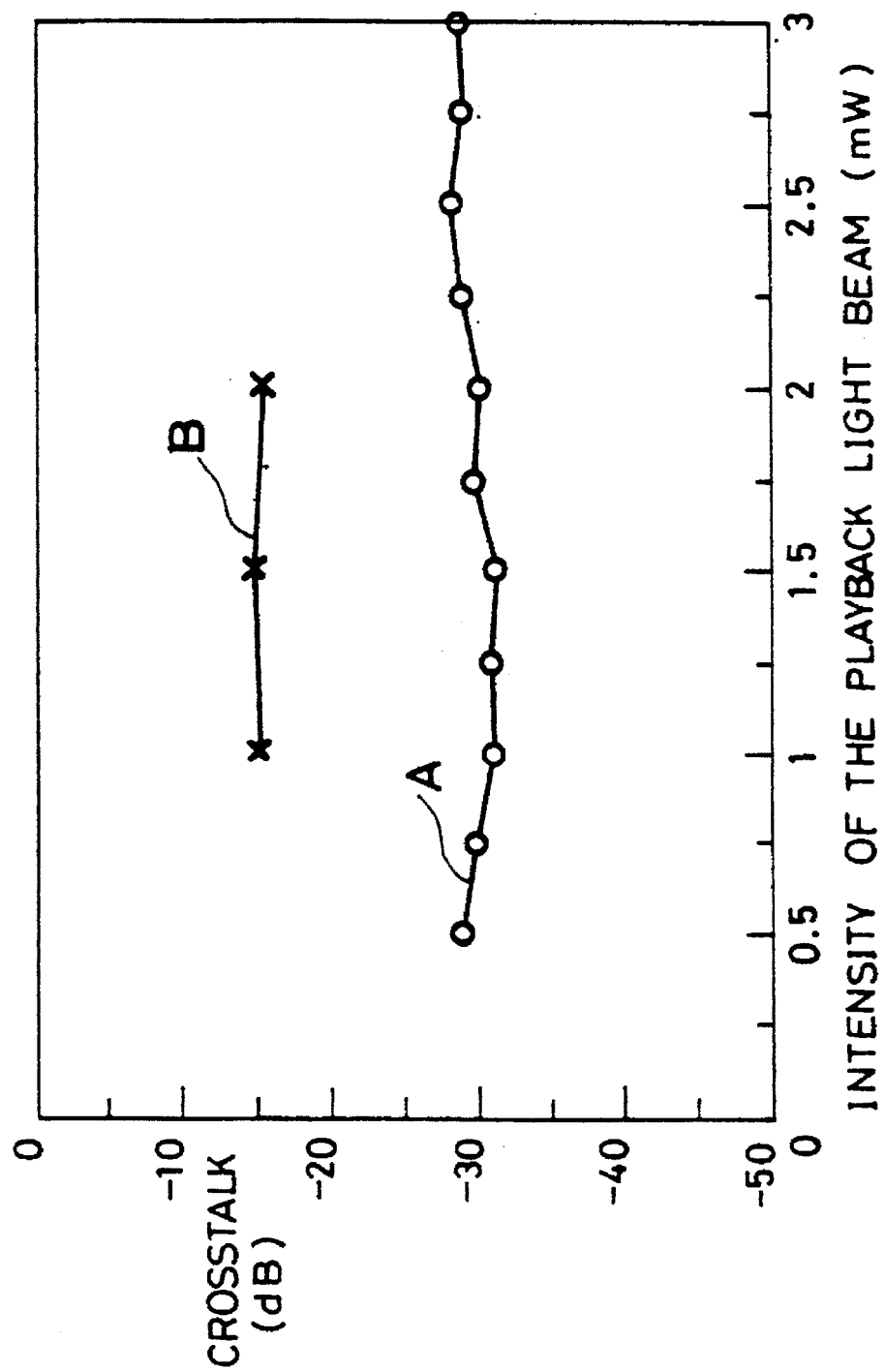
FIG. 11 is an explanatory view showing a graph of relationship between intensity of the playback light beam and quantity of the crosstalk in the readout layer having the property of FIG. 2.

FIG. 11 shows the result of the measurement. In the figure, the curve A indicates the measurement of the magneto-optical disk in this embodiment, and the curve B indicates that of the comparative magneto-optical disk. The crosstalk of the magneto-optical disk of this embodiment was about −30 dB and this value satisfies the IS 10089 Standard, while that of the comparative magneto-optical disk was about −15 dB and this value did not satisfy the IS 10089 Standard. The following is an explanation for that.

Figure 12:
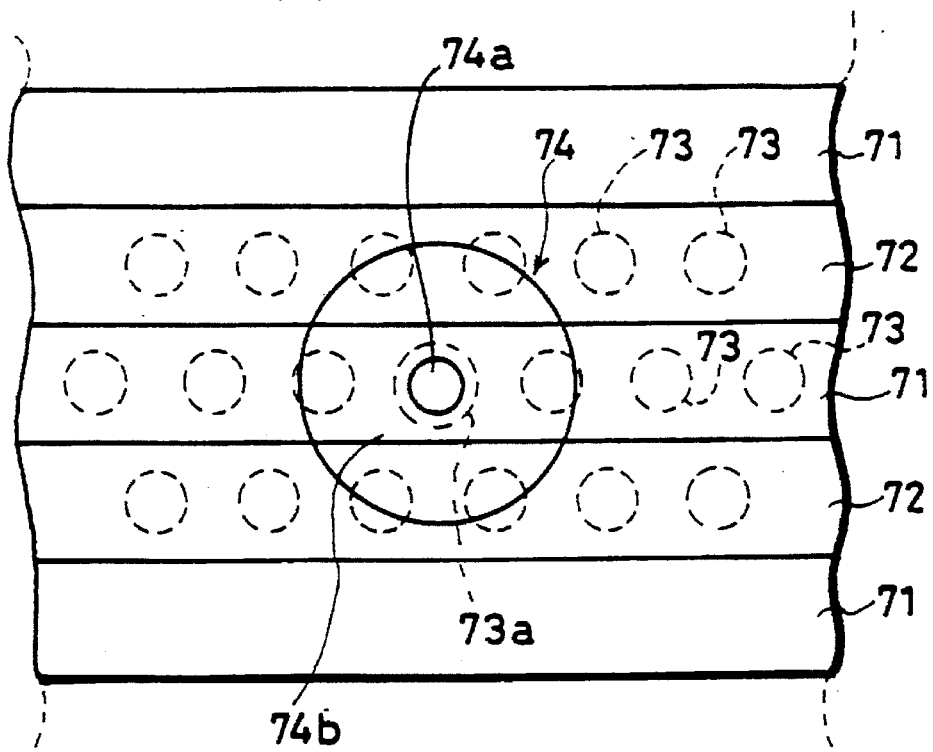
FIG. 12 is an explanatory view showing the condition that the light beam is irradiated on the magneto-optical recording disk in FIG. 1.

Recording bits 73 are provided at lands 71 and grooves 72 respectively in the magneto-optical recording disk, as shown in FIG. 12. When recording bits 73 on a land 71 are playing back and the playback light beam is servo controlled, there are seven recording bits 73 in a spot 74 of the playback light beam, assuming that the diameter of the spot 74 is 1.73 μm (the ary disk diameter: 1.22×780 nm/0.55) and that, because of convenience for explanation, a diameter of the recording bits 73 is 0.355 μm.

The spot 74 has a portion 74a around the center of the spot 74 and a surrounding 74b of the portion 74a: the former is hotter than the latter. In the magneto-optical disk of this embodiment, the magnetization becomes vertical magnetization only in a recording bit 73a which is irradiated by the portion 74a, while the magnetization keeps in-plane magnetization in the recording bits 73 which are irradiated by the surroundings 74b. Therefore, only the recording bit 73a is played back even though there are more than one recording bit in the spot 74. That is why the crosstalk amount can be reduced though a recording bit 73 is smaller than the spot 74.

In the comparative magneto-optical recording disk, all recording bits 73 irradiated by the spot 74 have vertical magnetization and show the Magnetic Kerr Effect. Therefore, played back signals from the recording bits 73 cannot be separated. That is why the crosstalk amount increases in the recording bits 73 smaller than the spot 74.

This measurement proves, from a point of view of crosstalk, that the recording density is improved in the magneto-optical recording disk of this embodiment by more than double of the comparative magneto-optical recording disk.

That is, the measurement proves, from points of view of both the signal quality and the crosstalk, that the recording density is improved in the magneto-optical disk of this embodiment by more than double of the comparative magneto-optical disk.

Note that the numerical aperture (N.A.) of the objective lens in the optical head is 0.55 and wave length of the light beam is 780 nm in these various measurement, but that they are not limited to such values. By using N.A. of 0.6 to 0.95 and the semiconductor laser beam of wave length of 670 nm to 680 nm, the Ar laser beam of wave length of 480 nm, and the Second Higher Harmonics Generating Elements (SHG Elements) laser beam of wave length of 335 nm to 600 nm, the spot diameter of the light beam can be reduced, resulting in that the recording density of the magneto-optical recording disk can be improved further.

The next explanation is about that the magneto-optical disk of this embodiment improves the recording density for various systems to guide the light beam condensed by an objective lens to a desired position on the magneto-optical disk.

As above mentioned systems, the following are general: (1) a consecutive servo system, wherein spiral or concentric guide tracks are used; land (2) a sample servo system, wherein spiral or concentric bit rows are used.

As shown in FIG. 16(a) and (b), the consecutive servo type magneto-optical disk is usually provided with, for example, guide tracks with a pitch d of 1.2 μm to 1.6 μm on the substrate 1. The guide track includes the grooves 82, for example, with width of 0.2 μm to 0.6 μm and depth of λ/(8 n) and the lands 81 with the recording bits 73. Here, λ is the wave length of the light beam and n is the index of refraction of the substrate 1. However, since the magneto-optical recording disk of this embodiment has small crosstalk amount by the neighboring recording bits 73 in the spot 74, the recording/playback condition is still good even though the width of the groove 82 is set to 0.1 μm to 0.4 μm and the pitch d of the guide track is set to 0.5 μm to 1.2 μm. Therefore, the recording density can be increased.

Similarly, as shown in FIGS. 17(a) and (b), in the case where, for example, (1) the pitch of a guide track is 0.8 μm to 1.6 μm, both width of the grooves 84 and width of the lands 83 being the same and (2) both the grooves 84 and the lands 83 have the recording bits 73 respectively, the recording/playback condition is still good and the recording density can be increased.

Moreover, as shown in FIGS. 18(a) and (b), in case where the position information of the disk is obtained by wobbling grooves 88, the crosstalk does not occur from a recording bit in the neighboring grooves 88 having reverse phase of wobbling against the land 87 in the magneto-optical disk of this embodiment. Therefore, the recording/playback condition is still good and the recording density can be increased.

Figure 19:
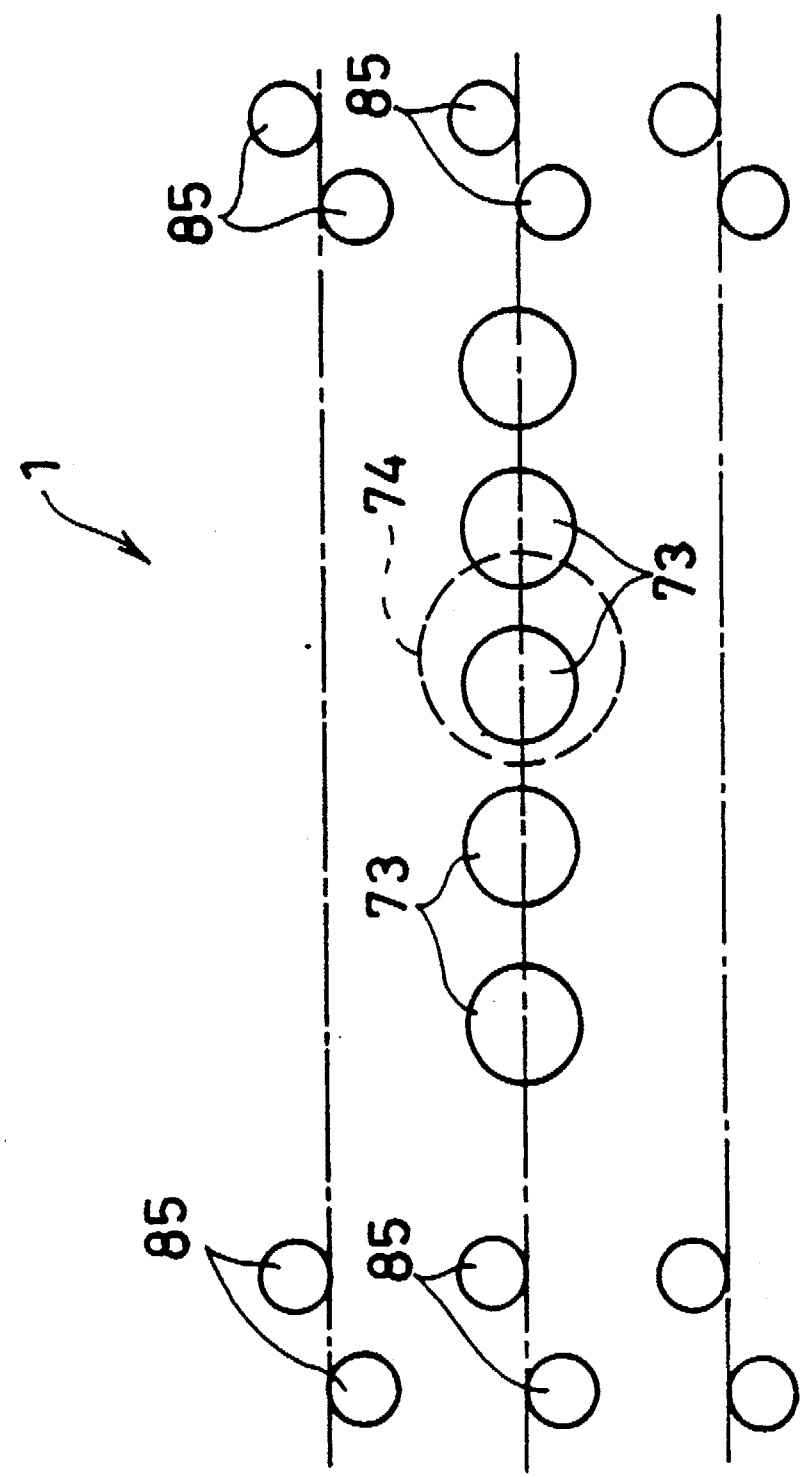
FIG. 19 is an explanatory view showing an example of arrangement of wobbled bits provided on a substrate of the magneto-optical recording disk.

As shown in FIG. 19, sample servo type magneto-optical disk usually has wobbled bits 85 of positive polarity with the pitch of 1.2 μm to 1.6 μm and the depth of λ/(4 n) on the substrate 1, and a light beam always scans on the alternate long and short dash line in the figure. However, since the magneto-optical disk of this embodiment has small crosstalk by the neighboring recording bits 73 in the spot 74, the recording/playback condition is still good even though width of the pitch of the wobbled bit is set to 0.5 μm to 1.2 μm. Therefore, the recording density can be increased.

Figure 20:
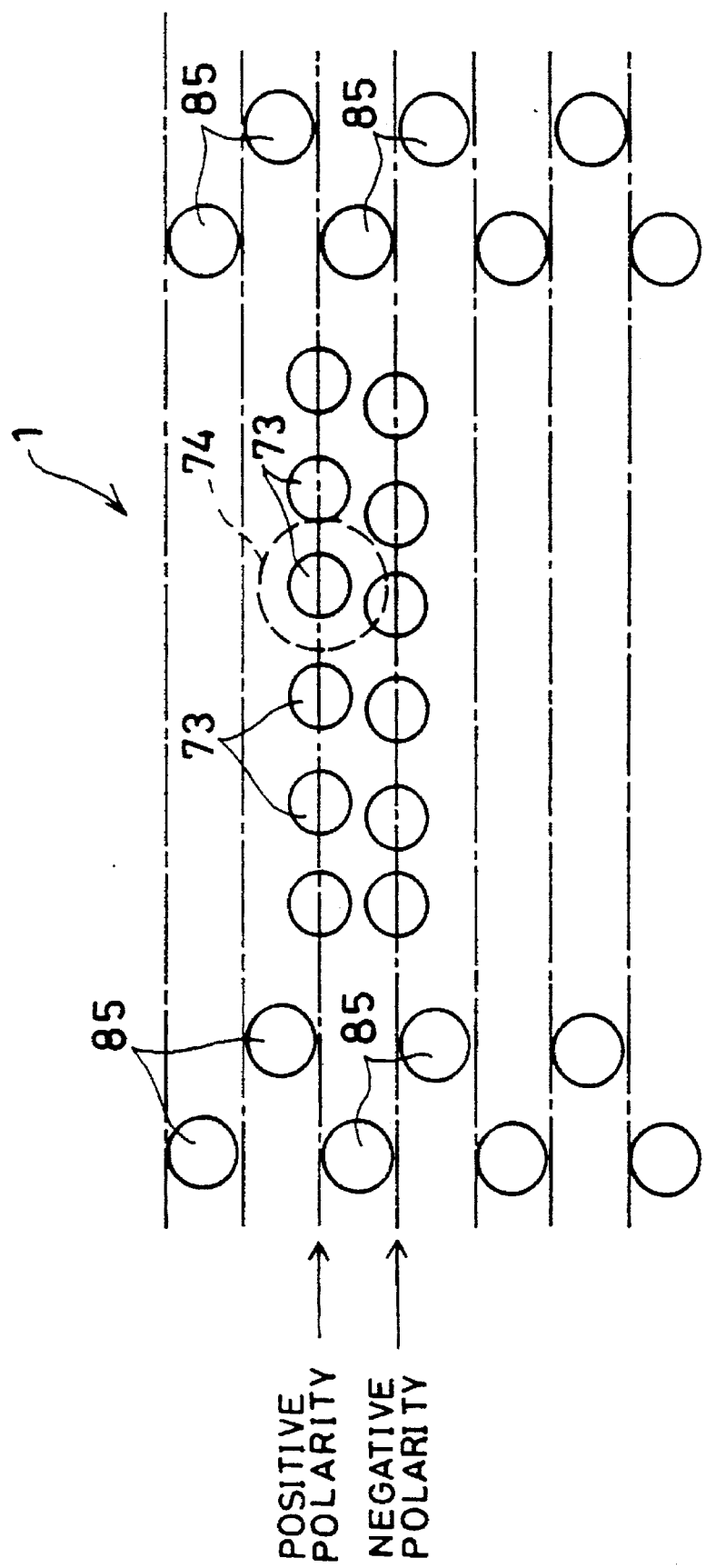
FIG. 20 is an explanatory view showing another example of the arrangement of the wobbled bits provided on a substrate of the magneto-optical recording disk.
Figure 21:
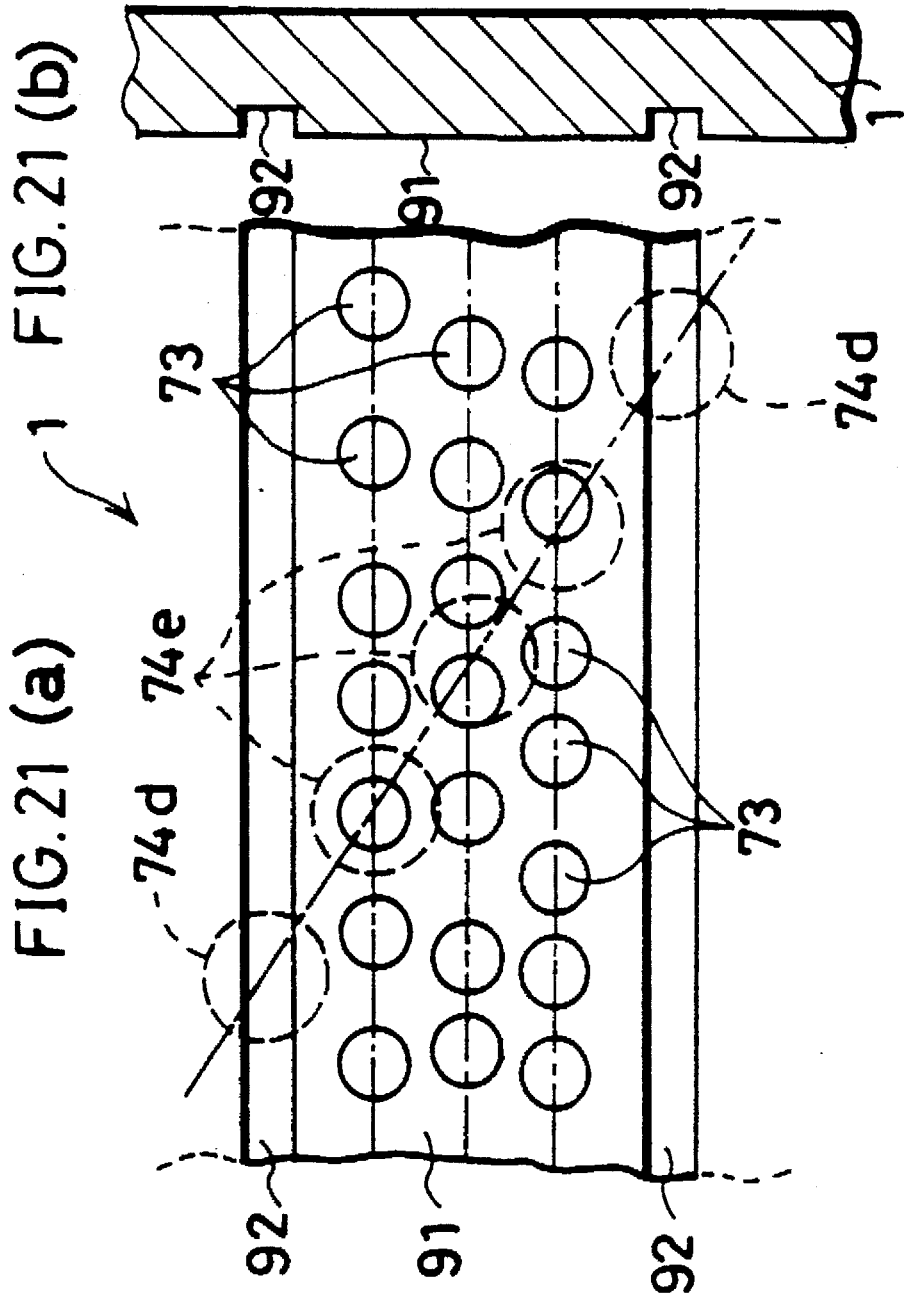
FIG. 21(a) and (b) are the explanatory views showing still another example of the arrangement of the wobbled bits provided on a substrate of the magneto-optical recording disk.

FIG. 20 shows a magneto-optical disk which has, for example, wobbled bits 85 with the pitch of 0.8 μm to 1.6 μm and the recording bits 73 are provided on both a line wherein the wobbled bits 85 exist in the positive polarity and a line wherein the wobbled bits 85 exist in the negative polarity. When the light beam is irradiated to the recording bits 73 positioned in positive polarity, the surrounding of the spot 74 include neighboring recording bits 73 positioned in negative polarity. However, in such case, since the magneto-optical disk of this embodiment has small crosstalk by the neighboring recording bits 73 in the spot 74, the recording/playback condition is still good and the recording density can be increased.

Further, for example, a multibeam type optical pickup with plural light beams may be used for recording and playback of the magneto-optical disk of this embodiment. As shown in FIGS. 21(a) and (b), in the optical pickup, positioning of the light beam spots is held by the light beams 74d which are at the both ends of a linear row of the plural light beams scanning grooves 92, while the light beams 74e positioned between the light beams 74d record and play back the recording bits 73 provided on the land 91. However, since the magneto-optical disk in this embodiment has small crosstalk by the neighboring recording bits 73, the recording/playback condition is still good even though interval of the light beam 74e or width of the land 91 is set narrow. Therefore, the recording density can be increased.

The following is an explanation about recording method of the magneto-optical disk in this embodiment. The magneto-optical disk makes recording by optical modulation overwriting.

Figure 22:
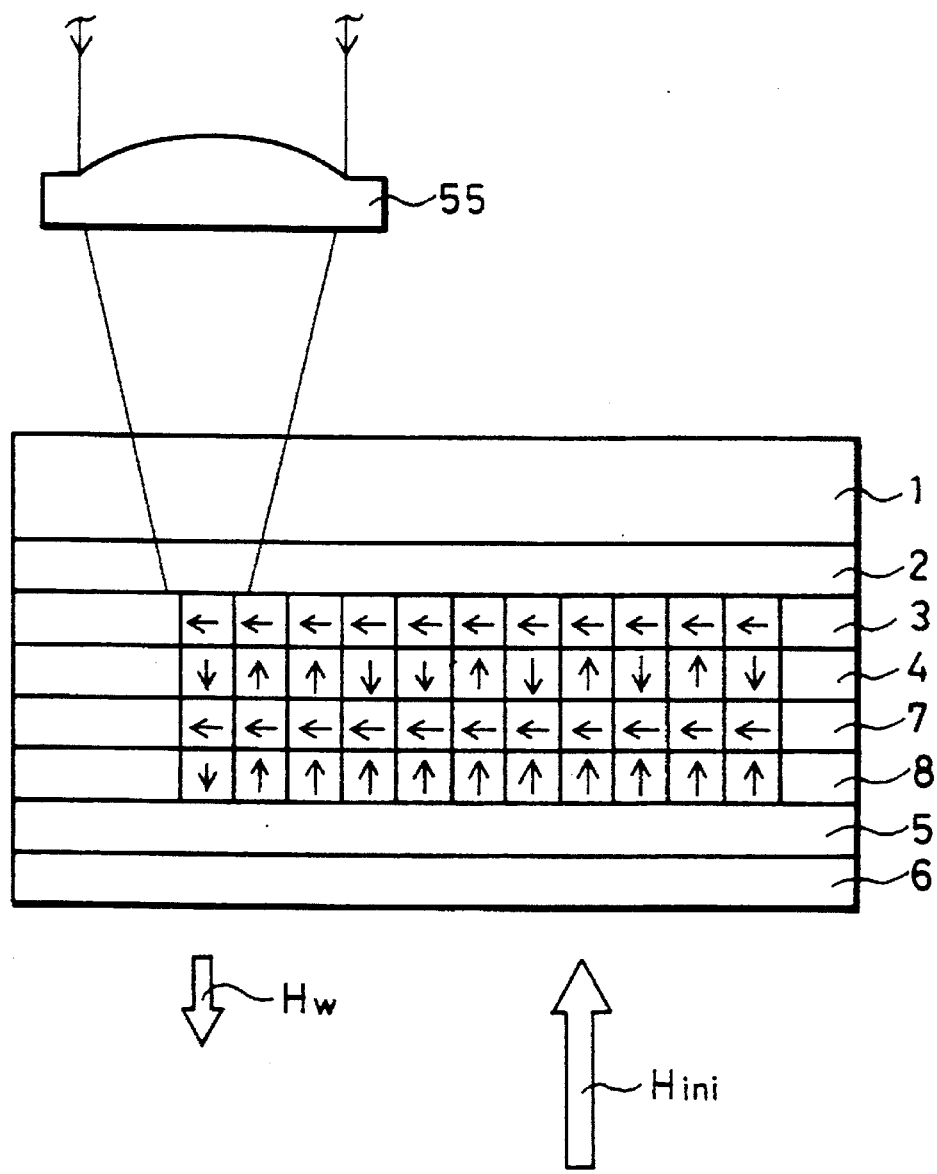
FIG. 22 is an explanatory view showing recording for the magneto-optical recording disk in FIG. 1.

First, as shown in FIG. 22, an initializing magnetic field $H_{ini}$ which is smaller than the coercive force Hc of the memory layer 4 at room temperatures is applied to the magneto-optical recording disk in this embodiment, so the magnetization direction of the writing layer 8 is initialized so as to direct in one direction, for example, upwards. Nevertheless, the magnetization of the memory layer 4 does not turn over since the coercive force Hc of the memory layer 4 is greater than the initializing magnetic field $H_{ini}$.

Next, a recording magnetic field $H_w$ which is enough smaller than the initializing magnetic field $H_{ini}$ is applied. At the same time, the light beam condensed by the objective lens 55 and modulated at high and low level intensity, is irradiated on the disk. Then, information is recorded on the desired position of the memory layer 4 as follows.

When the light beam modulated at high level intensity, which is hereinafter referred to as high level light beam, is irradiated, both temperatures of the memory layer 4 and that of the writing layer 8 rise near their own Curie temperature or higher temperature respectively. Then, each magnetization of the layers 4 and 8 once becomes 0. Consequently, the magnetization of the writing layer 8 turns over downwards by the recording magnetic field $H_w$. There is coupling force exerted between the writing layer 8 and the memory layer 4 through the intermediate layer 7. When the cooling process begins after the light beam leaves, the magnetization of the writing layer 8 is copied to the memory layer 4 so that the magnetization direction of the memory layer 4 coincides with that of the writing layer 8 by the coupling force, directing downwards.

On the other hand, when the light beam modulated at low level intensity, which is hereinafter referred to as low level light beam, is irradiated, the temperature of the memory layer 4 rises to near its Curie temperature or higher temperature, but the temperature of the writing layer 8 does not rise to near its Curie temperature. Therefore, though the magnetization of the memory layer 4 once becomes 0, the magnetization of the writing layer 8 does not change. Consequently, the magnetization of the writing layer 8 does not turn over by the recording magnetic field $H_w$, but keeps upwards. When the cooling process begins after the light beam leaves, the magnetization of the writing layer 8 is copied to the memory layer 4 so that the magnetization direction of the memory layer 4 coincides with the magnetization direction of the writing layer 8 by the above described coupling force, directing upwards.

That is, the magnetization direction of the memory layer 4 can be changed by controlling the level of light beam. In this way, information can be recorded at a desired position of the memory layer 4.

Meanwhile, since the readout layer 3 keeps the in-plane magnetization, it does not contribute to recording.

By the way, optical modulation overwrite recording is carried out between the memory layer 4 and the writing layer 8. However, both layers 4 and 8 show the vertical magnetic anisotropy, so a domain wall would occur in either layer and recording would be interrupted according to magnetic condition if there were no measures provided in order to prevent a domain wall occurring. Therefore, the magneto-optical disk of this embodiment is provided with the intermediate layer 7 which shows the in-plane magnetization from room temperatures to its Curie temperature. At this time, since the intermediate layer 7 forms a domain wall, optical modulation overwrite recording is carried out without obstacles.

When recorded information is played back, the playback light beam is irradiated to the readout layer 3 of the magneto-optical disk in this embodiment. As already described, the temperature distribution of the irradiated portion shows Gaussian distribution because the intensity distribution of the playback light beam shows Gaussian distribution. Therefore, the temperature rises only at a portion smaller than the diameter of the playback light beam spot. The magnetization changes from the in-plane magnetization to the vertical magnetization at the portion where the temperature rises in the readout layer 3 according to the temperature rising. At this time, since the recording magnetic field $H_w$ is not applied or is applied enough lower than the coercive force Hc of the memory layer 4, the magnetization direction is copied from the portion of the memory layer 4 to the corresponding portion where the temperature rises in the readout layer 3 by the coupling force exerted between the readout layer 3 and the memory layer 4. Therefore, the magnetization direction of the readout layer 3 coincides with the magnetization direction of a corresponding portion of the memory layer 4.

Then, the recorded information in the memory layer 4 is played back, based on the reflected light from the portion where the temperature rises in the readout layer 3.

When the next recording bit is played back with a shift of playback light beam, the temperature at the portion previously irradiated with the playback light beam falls, and the magnetization of the portion changes from the vertical magnetization to the in-plane magnetization. Then, the magnetization recorded at the portion of the memory layer 4 corresponding to the portion where the temperature was high in the readout layer 3 is masked by the in-plane magnetization of the readout layer 3 so as not to be read out, thereby preventing entering of signals from neighboring recording bits, which is the cause of generation of a noise, i.e., crosstalk.

Since only a portion having a temperature higher than the predetermined temperature in the readout layer 3 contributes to playback in this way, a recording bit smaller than the spot diameter can be played back so that the recording density improves remarkably.

The feature of the magneto-optical disk in the embodiment is described as above, but the structure of the magneto-optical disk is not limited to the above structure. The following is description about required various conditions and concrete examples.

The readout layer 3 is not limited to $Gd_{0.26}(Fe_{0.82}Co_{0.18})_{0.74}$. Materials having the compensation temperature which is higher than room temperatures and showing the vertical magnetization near the compensation temperature is preferable as the readout layer 3. The rare earth-transition metal alloy is preferable. The rare earth-transition metal amorphous alloy having a predetermined composition range has a compensation temperature where the magnetization of the the rare earth metal and that of the transition metal balance. Accordingly, the following are explanations about various rare earth-transition metal alloys used for the readout layer 3.

Figure 13:
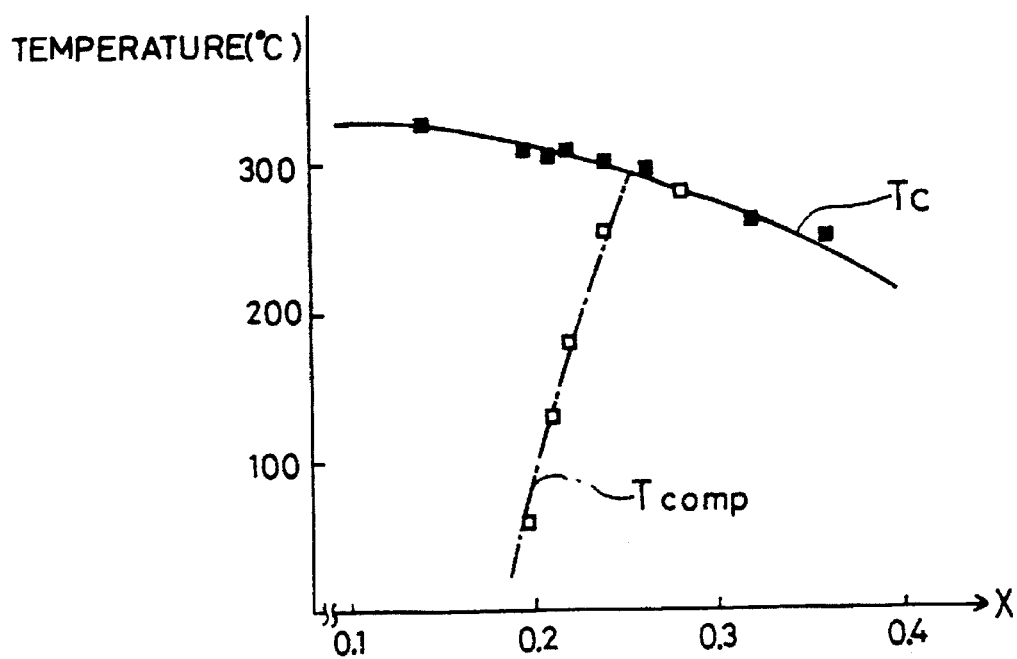
FIG. 13 is an explanatory view showing the composition dependency of a Curie temperature Tc and the composition dependency of the compensation temperature $T_{comp}$ of $Gd_x(Fe_{0.82}Co_{0.18})_{1-x}$.

First, the following is an explanation about the composition dependency of both a Curie temperature Tc and the compensation temperature $T_{comp}$ in $Gd_x(Fe_{0.82}Co_{0.18})_{1-x}$ with reference of FIG. 13. The compensation temperature $T_{comp}$ is the temperature where the coercive force Hc is infinity, while a Curie temperature is the temperature where the coercive force Hc is 0 and the magnetization disappears.

According to FIG. 13, it is when the composition $X \geq \times 0.18$, preferably $0.19 < x < 0.29$ that the compensation temperature $T_{comp}$ is over a room temperature (25° C.). If the composition x is in the range, the magnetization changes from the in-plane magnetization to the vertical magnetization in the readout layer 3 in the range from the room temperature to 200° C. If the temperature is higher, the playback light beam intensity needs to be strengthened as high as the intensity of the recording light beam. However, such strengthening is not desirable because it causes recording to the memory layer 4.

Figure 14:
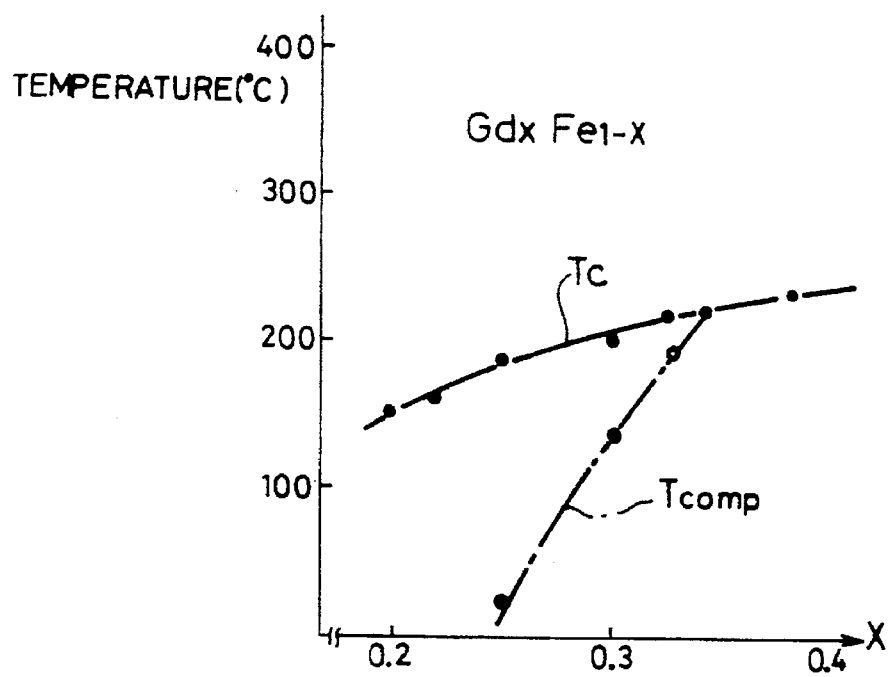
FIG. 14 is an explanatory view showing the composition dependency of a Curie temperature Tc and the composition dependency of the compensation temperature $T_{comp}$ of $Gd_xFe_{1-x}$.
Figure 15:
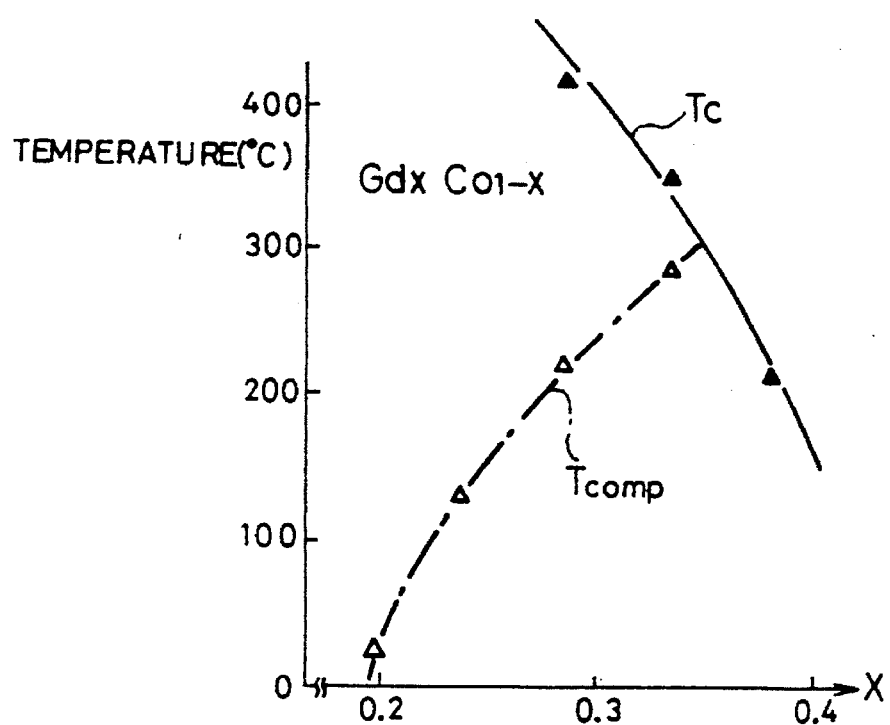
FIG. 15 is an explanatory view showing the composition dependency of a Curie temperature Tc and the composition dependency of the compensation temperature $T_{comp}$ of $Gd_xCo_{1-x}$.
Figure 18:
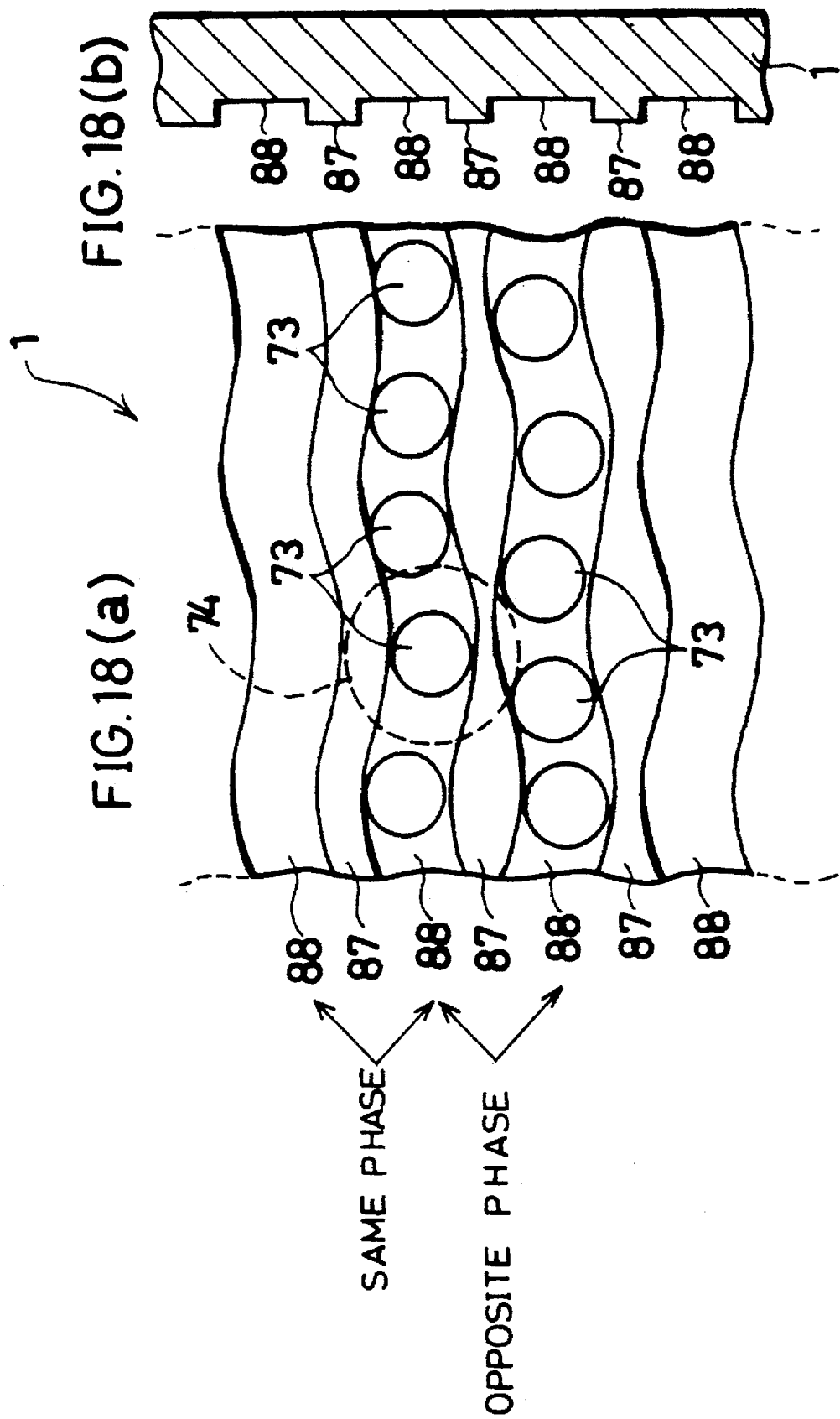
FIGS. 18(a) and (b) are the explanatory views showing an example of shape of both the lands and the wobbling grooves provided on a substrate of the magneto-optical recording disk.

The following is an explanation about composition dependency of a Curie temperature and compensation temperature $T_{comp}$ in $Gd_x(Fe_{1-y}Co_y)_{1-x}$ with reference of FIG. 14 and 15.

FIG. 14 shows the composition dependency of both a Curie temperature and the compensation temperature $T_{comp}$ in a case where the composition ratio of Co y=0, i.e. $Gd_xFe_{1-x}$, and the compensation temperature $T_{comp}$ is not less than room temperatures when the composition ratio of Gd $0.24<x<0.35$. For example, when x=0.3, the Curie temperature Tc is about 200° C. and the compensation temperature $T_{comp}$ is about 120° C.

FIG. 15 shows the composition dependency of both a Curie temperature and the compensation temperature $T_{comp}$ in a case where the composition ratio of Fe (1-y)=0, i.e. $Gd_xCo_{1-x}$, and the compensation temperature $T_{comp}$ is not less than room temperatures when the composition ratio of Gd $0.20<x<0.35$. For example, when x=0.3, the Curie temperature Tc is about 400° C and the compensation temperature $T_{comp}$ is about 220° C.

These measurements indicate the Curie temperature and the compensation temperature $T_{comp}$ increase as the composition ratio of Co y increases even though the composition ratio of Gd x is constant.

Generally, signal quality C/N is higher as the Magnetic Kerr Rotating Angle $\theta_K$ is greater during the playback. Therefore, it is considered that a higher Curie temperature has more advantages in the readout layer 3. However, these measurements prove that increase of the composition of Co y also causes increase of the temperature where the magnetization changes from in-plane magnetization to vertical magnetization. Taking it into consideration, the composition ratio of Co $0.1<y0.5$ in $Gd_x(Fe_{1-y}Co_y)_{1-x}$ is desirable. Additionally, the property of the readout layer 3 is influenced by condition such as material, composition, and membrane thickness of the memory layer 4, by the magnetic coupling force exerted between the readout layer 3 and the memory layer 4. Therefore, it is desirable that the conditions of readout layer 3, such as the composition, and the membrane thickness, is preferably determined according to the conditions of the memory layer 4.

Similarly, the compensation temperature $T_{comp}$ is not less than room temperatures when the composition ratio of Tb $0.20<x<0.30$ in $Tb_x(Fe_yCo_{1-y})_{1-x}$. (Here, the composition ratio of Co y is arbitrary.) The compensation temperature $T_{comp}$ is not less than room temperatures when the composition ratio of Dy $0.24<x<0.33$ in $Dy_x(Fe_yCo_{1-y})_{1-x}$. (Here, the composition ratio of Co y is arbitrary.) The compensation temperature $T_{comp}$ is not less than room temperatures when the composition ratio of Ho $0.25<x<0.45$ in $Ho_x(Fe_yCo_{1-y})_{1-x}$. (Here, the composition ratio of Fe y is arbitrary.)

Meanwhile, the Magnetic Kerr Rotating Angle $\theta_K$ of the rare earth-transition metal alloy has wave length dependency that the Magnetic Kerr Rotating Angle $\theta_K$ decreases as the wave length of light beam becomes shorter. However, adding a trace of at least one kind of metal of Nd, Pr, Pt, and Pd to the above mentioned respective rare earth-transition metal alloys, the Magnetic Kerr Rotating Angle $\theta_K$ is still enough great without loss of the property of the rare earth-transition metal alloy even in case where the light beam wave length is short. Moreover, adding a trace of at least one kind of metal of Cr, V, Nb, Mn, Be, and Ni to the respective rare earth-transition metal alloys, oxidation of the rare earth-transition metal alloy by invasion of moisture and oxygen can be reduced, resulting in that environmental capability of the rare earth-transition metal alloy is improved.

Similarly, the memory layer 4 is not limited to the above described DyFeCo. Materials having a Curie temperature lower than that of the writing layer 8 and having the coercive force Hc higher than both the coercive force of the writing layer 8 and an initializing magnetic field $H_{ini}$ described later, and which directs in the magnetization direction of the writing layer 8 at high temperatures is preferable as the memory layer 4. The rare earth-transition metal alloys, such as, TbFeCo, GdTbFe, NdDyFeCo, GdDyFeCo, and GdTbFeCo are preferable. Moreover, adding a trace of at least one kind of metal of Cr, V, Nb, Mn, Be, and Ni to the rare earth-transition metal alloy, environmental capability of the rare earth-transition metal alloy is improved, as already described.

Similarly, the intermediate layer 7 is not limited to the above described GdFeCo. Materials having a Curie temperature higher than that of the memory layer 4 and where the magnetization is in-plane from room temperatures to its Curie temperature is preferable as the intermediate layer 7. The rare earth-transition metal alloys, such as, TbFeCo, GdTbFe, GdCo, NdDyFeCo, GdDyFeCo, and GdTbFeCo are preferable. Moreover, adding a trace of at least one kind of metal of Cr, V, Nb, Mn, Be, and Ni to the rare earth element-transition metal alloys, environmental capability of the rare earth-transition metal alloy is improved, as already described.

Similarly, the writing layer 8 is not limited to the above described GdDyFeCo. Materials having a Curie temperature higher than that of the memory layer 4 and having the coercive force Hc of which is lower than both the coercive force of the memory layer 4 and the initializing magnetic field $H_{ini}$, described later, are preferable as the writing layer 8. The rare earth-transition metal alloys, such as TbFeCo, GdTbFe, NdDyFeCo, DyFeCo, and GdTbFeCo are preferable. Moreover, adding a trace of at least one kind of metal of Cr, V, Nb, Mn, Be, and Ni to the respective rare earth element-transition metal alloys, environmental capability of the rare earth-transition metal alloy is improved, as already described.

The membrane thickness of the readout layer 3 is not limited to 50 nm. The membrane thickness of 20 nm to 100 nm is desirable, and the membrane thicker than 50 nm is more desirable. It is not desirable that the membrane of the readout layer 3 is thinner than 20 nm, because it reduces the mask effect to the memory layer 4 by the in-plane magnetization of the readout layer 3. It is not desirable either that the membrane of the readout layer 3 is thicker than 100 nm because it makes transcription of information from the memory layer 4 difficult.

The membrane thickness of the memory layer 4 is not limited to 50 nm, and the membrane thickness of 20 nm to 100 nm is desirable.

The index of refraction of the transparent dielectric layer 2, which can be changed by changing pressure of gas atmosphere during sputtering and changing such as mixing rate of Ar gas and $N_2$ gas, is preferably 1.8 to 2.1.

The membrane thickness of the transparent dielectric layer 2 is not limited to 80 nm, but is preferably set according to such as its index of refraction and the playback light beam wave length. The membrane of the transparent dielectric layer 2 is determined, considering so-called Kerr effect enhancement which increases the Magnetic Kerr Rotating Angle $\theta_K$ by the interference effect of the light beam. Generally, the Magnetic Kerr Rotating Angle $\theta_K$ is preferably set in order to increase signal quality C/N during the playback. For example, the membrane thickness of the transparent dielectric layer 2 is preferably set to 30 nm to 120 nm for playback light beam of 780 nm, more preferably to 70 nm to 100 nm. The thickness of the transparent dielectric layer 2 is preferably set about half of the above described thickness for the playback light beam of 400 nm. Moreover, in case that material or index of refraction of the transparent dielectric layer 2 is different, the membrane thickness is so set that light path length which is the product of the index of refraction and the membrane thickness (for example, it is 160 nm when the index of refraction is 2.0 and the membrane thickness is 80 nm) may be equal to the above described membrane thickness. Note that the membrane thickness can be made thinner as greater index of refraction is used, and Kerr effect enhancement can be greater.

The thickness of the protection layer 5 is not limited to 20 nm and can be set in a range of 1 nm to 200 nm. Since both heat conductivity and thermal capacities (specific heat) of the respective protection layer 5 and the transparent dielectric layer 2 influence the recording sensitivity of the memory layer 4, it is preferable to make the membrane thickness of the protection layer 5 thin for example, in order to increase the recording sensitivity.

The transparent dielectric layer 2 and the protection layer 5 is not limited to the above described AlN, but, for example, SiN, AlSiN, AlTaN, SiAlON, TiN, TiON, BN, ZnS, $TiO_2$, $BaTiO_3$, $SrTiO_3$, and so on are desirable. If the same material is used for the transparent dielectric layer 2 and the protection layer 5, productivity of the magneto-optical disk can be improved.

Similarly, the substrate 1 is not limited to the above described glass, but, for example, chemically tempered glass, glass with 2P layers on which glass an ultraviolet radiation hardened resin layer is formed, polycarbonate(PC), polymethylmethacrynate(PMMA), amorphous polyolefin (APC), polystyrene(PS), polyvinylchloride(PVC), and epoxy resin may be used. If chemically tempered glass is used as a material for the substrate 1, reliability of the magneto-optical recording disk is improved because of the following advantages: (a) The glass is hard to be scratched and to crack due to its hardness; (b) It is chemically stable and insoluble to various solvents; (c) It is hard to adhere dusts to the substrate because it is hard to be charged; (d) It is excellent in mechanical property such as face vibration, eccentricity, warping, and inclination, and also excellent in humidity resistance, oxidation resistance, and heat resistance. Thus, reliability of the magneto-optical disk can be improved. Moreover, if the chemically hardened glass is used, high signal quality C/N can be achieved due to its excellent optical property. Additionally, reactive dry etching method is used for example, in order to form guide tracks for guiding a light beam and to form pre-pits on the chemically reinforced glass in advance. In order to form them on the glass with 2P layers, a stamper is stacked on an ultraviolet radiation hardened resin layer, and after that, the layer is hardened by irradiation of ultraviolet ray. When the above described various plastics are used as the substrate 1, the productivity is improved because injection molding is permitted and mass production of the same substrate is enabled.

The material used in the substrate 1 is not limited to the above described material provided that the following various optical and mechanical properties are satisfied: (a) the index of refraction is 1.44 to 1.62; (b) birefringence (Reciprocating birefringence measured by parallel light) is less than 100 nm; (c) permeability is more than 90%; (d) dispersion in thickness is ±0.1 mm; (e) inclination is less than 10 mrad, preferably less than 5 mrad; (f) face vibration acceleration is less than 10 m/s²; and (g) radial direction acceleration is less than 3 m/s².

Furthermore, the above described various recordings can be adapted to the following magneto-optical recording disks: (a) a disk with a hard coating layer laminated on the front surface of the overcoating layer 6; (b) a disk with hard coating layers laminated both on the rear surface (the surface irradiated by the light beam) of the substrate 1 and on the front surface of the overcoating layer 6; (c) a disk with a charge preventing layer laminated on the hard coating layers formed in the above (a) and (b); and (d) a disk with a moisture penetration preventing layer laminated on the rear surface of the substrate 1 and with an additional overcoating layer laminated thereon.

The hard coating layer of the above described structure (a) is made of acrylate family of ultraviolet radiation hardened resin with a membrane thickness of 3 μm for example, exceeding in hardness and abrasion resistance. Therefore, the hard coating layer makes the disk harder to be damaged. It is also possible to add the hard coating function to the overcoating layer 6 instead of providing the hard coating layer, resulting in that the overcoating layer 6 and the hard coating layer become one layer. Since the magneto-optical disk of the above described structure (b) is provided with another hard coating layer on the rear surface of the substrate 1 of the magneto-optical disk of the above described structure (a), the hard coating layer makes the disk much harder to be damaged.

The charge preventing layer of the above described structure (c) is made of acryl family of hard coat resin of membrane thickness of 2 μm to 3 μm with conductance filler included for example, thereby reducing the superficial resistivity. The charge preventing layer makes dust hard to adhere to the disk. It is also possible to add charge preventing function to the hard coating layer instead of providing with the separate charge preventing layer, resulting in that the charge preventing layer and the hard coating layer become one layer.

The moisture penetration preventing layer of the above described structure (d) is made of the same material as that of the transparent dielectric layer 2, and with a membrane thickness of 5 nm for example. The additional overcoating layer is made of the same material as that of the overcoating layer 6. The moisture preventing layer reduces moisture penetration to the substrate 1, thereby reducing the warping of the magneto-optical recording disk due to the change of humidity. It is also possible to add hard coating function and charge preventing function to the additional overcoating layer.

Figure 23:
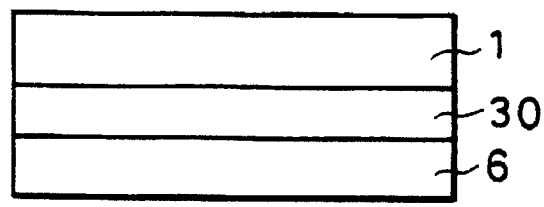
FIG. 23 is an explanatory view showing a structure of one side type magneto-optical recording disk.
Figure 24:
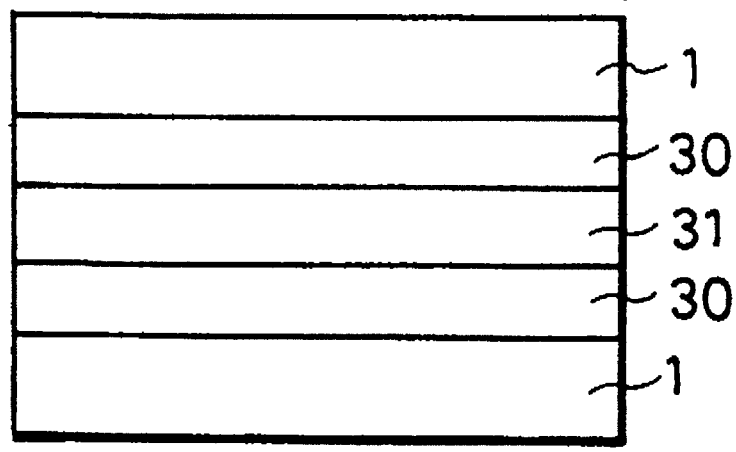
FIG. 24 is an explanatory view showing a structure of both side type magneto-optical recording disk.

As shown in FIG. 23, the foregoing explanation was for a so-called one-side magneto-optical recording disk which is provided with the substrate 1, the recording medium layer 30 (which is composed of the transparent dielectric layer 2, the readout layer 3, the memory layer 4, the intermediate layer 7, the writing layer 8, and the protection layer 5), and the overcoating layer 6 laminated in this order. However, the explanation can also be adapted to a so-called both-side magneto-optical recording disk, which is provided, as shown in FIG. 24, with the substrate 1, the recording medium layer 30, a bonding layer 31, the recording medium layer 30, and the substrate 1 laminated in this order. Here, each layer which forms the recording medium layer 30 is arranged symmetrically for the bonding layer 31.

The bonding layer 31 is adhesives of polyurethane acrylate family for example and has moisture resistance. A both side magneto-optical recording disk makes it possible to record and play back information of still higher density.

The following is an explanation about a second embodiment of the present invention with reference to FIG. 1. The magneto-optical recording disk in this embodiment is provided with an intermediate layer 17 described later, instead of the intermediate layer 7, differing from the magneto-optical recording disk in the first embodiment, but the same at other points to the first embodiment.

$Gd_{0.20}(Fe_{0.90}Co_{0.10})_{0.74}$ is used for the intermediate layer 17 having a film thickness of 40 nm and a Curie temperature Tc of about 250° C., and changing from the in-plane magnetization to the perpendicular magnetization at about 150° C., for example in this embodiment. In case where the Curie temperature Tc of the intermediate layer 17 is higher than that of the memory layer 4 and the temperature where the intermediate layer 17 changes from the in-plane magnetization to the perpendicular magnetization is higher than the temperature where the readout layer 3 changes from the in-plane magnetization to the perpendicular magnetization, information reproducing with excellent super-resolution and optical modulation overwriting are made possible. As well as the above described GdFeCo, the rare earth-transition metal alloys such as TbFeCo, GdTbFe, GdCo, NdDyFeCo, GdDyFeCo, and GdTbFeCo are preferable. Moreover, adding a trace of at least one kind of metal of Cr, V, Nb, Mn, Be, and Ni to the respective rare earth-transition metal alloy, environmental capability of the rare earth-transition metal alloy is improved similarly to the first embodiment.

Since the structure, the membrane thickness, and various properties of each layer of the substrate 1, the transparent dielectric layer 2, the readout layer 3, the memory layer 4, the writing layer 8, the protection layer 5, and the overcoating layer 6 are the same as respective corresponding layers in the magneto-optical recording disk in the first embodiment, detailed explanation about them are omitted. Similarly, since the mechanism for recording and playback by the optical modulation overwriting is also the same, the detailed explanation is omitted.

Since both the memory layer 4 and the writing layer 8 show the vertical magnetic anisotropy similarly to the first embodiment, a domain wall would occur in one of the layers according to the magnetic condition if there were no measures in order to prevent the domain wall from occurring. However, the magneto-optical disk in this embodiment is provided with the intermediate layer 17 which shows the in-plane magnetization at room temperatures while changes to the vertical magnetization according to the temperature rising between the memory layer 4 and the writing layer 8. Therefore, the intermediate layer 17 forms a domain wall at room temperatures. That makes it possible to initialize the writing layer 8 with a low initializing magnetic field $H_{ini}$. Meanwhile, since the intermediate layer 17 changes from the in-plane magnetization to the vertical magnetization at high temperatures, the coupling force exerted between the writing layer 8 and the memory layer 4 grows greater in the cooling process. That makes it easy to copy the magnetization direction of the writing layer 8 to the memory layer 4. Therefore, the optical overwriting recording is carried out without obstacles.

In the two embodiments of the present invention, explanation is held about a magneto-optical recording disk for a magneto-optical recording medium. However, the invention is not limited to it, but can be adopted to other magneto-optical media such as a magneto-optical tape, and a magneto-optical card.

The invention being thus described, it may be obvious that the same may be varies in many ways. Such variations are not to be regarded as a departure from the scope of the invention.

What is claimed is:

1. A magneto-optical recording medium comprising:

a substrate;

a readout layer which shows in-plane magnetization at room temperature and in which a change occurs from in-plane magnetization to perpendicular magnetization when temperature is not less than a first temperature;

a memory layer, provided on one side of the readout layer, for recording thereon information magneto-optically;

an intermediate layer, formed on a side of the memory layer, this side being opposite to a side provided with the readout layer, and having in-plane magnetization from room temperature to its Curie temperature and having a film thickness thinner than a film thickness of the readout layer;

a writing layer, having a Curie temperature higher than a Curie temperature of the memory layer, and having a coercive force lower than a coercive force of the memory layer at room temperature, formed on a side of the intermediate layer, this side being opposite to a side provided with the memory layer.

2. The magneto-optical recording medium according to claim 1, wherein the readout layer is made of a rare earth-transition metal alloy.

3. The magneto-optical recording medium according to claim 2, wherein the rare earth-transition metal alloy includes a $Gd_x(Fe_{1-y}Co_y)_{1-x}$, where the relations $0.20<x<0.35$ and $0.1<y<0.5$ are satisfied.

4. The magneto-optical recording medium according to claim 2, wherein the rare earth-transition metal alloy includes a $Tb_x(Fe_yCo_{1-y})_{1-x}$, where the relation $0.20<x<0.30$ is satisfied, and where y is a decimal value.

5. The magneto-optical recording medium according to claim 2, wherein the rare earth-transition metal alloy includes a $Dy_x(Fe_yCo_{1-y})_{1-x}$, where the relation $0.24<x<0.33$ is satisfied, and where y is a decimal value.

6. The magneto-optical recording medium according to claim 2, wherein the rare earth-transition metal alloy includes a $Ho_x(Fe_yCo_{1-y})_{1-x}$, where the relation $0.25<x<0.45$ is satisfied, and where y is a decimal value.

7. The magneto-optical recording medium according to claim 2, wherein the rare earth-transition metal alloy includes a $Gd_{0.26}(Fe_{0.82}Co_{0.18})_{0.74}$.

8. The magneto-optical recording medium according to claim 1, wherein the memory layer is made of DyFeCo.

9. The magneto-optical recording medium according to claim 1, wherein the writing layer is made of a GdDyFeCo.

10. The magneto-optical recording medium according to claim 1, wherein the intermediate layer is made of a GdFeCo.

11. A magneto-optical recording medium comprising:

substrate;

a readout layer which shows in-plane magnetization at room temperature and in which a change occurs from in-plane magnetization to perpendicular magnetization when temperature is not less than a first temperature;

a memory layer, provided on one side of the readout layer, for recording thereon information magneto-optically;

an intermediate layer, formed on a side of the memory layer, this side being opposite to a side provided with the readout layer, which shows in-plane magnetization at room temperature and in which a change occurs from in-plane magnetization to perpendicular magnetization when temperature is not less than a second temperature higher than said first temperature; and a writing layer, having a Curie temperature higher than a Curie temperature of the memory layer and having a coercive force lower than a coercive force of the memory layer at room temperature, formed on a side of the intermediate layer, this side being opposite to a side provided with the memory layer.

12. The magneto-optical recording medium according to claim 11, wherein the readout layer is made of a rare earth-transition metal alloy.

13. The magneto-optical recording medium according to claim 12, wherein the rare earth-transition metal alloy includes a $Gd_x(Fe_{1-y}Co_y)_{1-x}$, where the relations $0.20<x<0.35$ and $0.1<y<0.5$ are satisfied.

14. The magneto-optical recording medium according to claim 12, wherein the rare earth-transition metal alloy includes a $Tb_x(Fe_yCo_{1-y})_{1-x}$, where the relation $0.20<x<0.30$ is satisfied, and where y is a decimal value.

15. The magneto-optical recording medium according to claim 12, wherein the rare earth-transition metal alloy includes a $Dy_x(Fe_yCo_{1-y})_{1-x}$, where the relation $0.24<x<0.33$ is satisfied, and where y is a decimal value.

16. The magneto-optical recording medium according to claim 12, wherein the rare earth-transition metal alloy includes a $Ho_x(Fe_yCo_{1-y})_{1-x}$, where the relation $0.25<x<0.45$ is satisfied, and where y is a decimal value.

17. The magneto-optical recording medium according to claim 12, wherein the rare earth-transition metal alloy includes a $Gd_{0.26}(Fe_{0.82}Co_{0.18})_{0.74}$.

18. The magneto-optical recording medium according to claim 11, wherein the memory layer is made of a DyFeCo.

19. The magneto-optical recording medium according to claim 11, wherein the writing layer is made of a GdDyFeCo.

20. The magneto-optical recording medium according to claim 11, wherein the intermediate layer is made of a GdFeCo.

* * * * *